US012703793B2

(12) United States Patent
Hayakawa et al.

(10) Patent No.: US 12,703,793 B2
(45) Date of Patent: Aug. 11, 2026

(54) MARINE-BIODEGRADATION ACCELERATOR

(71) Applicant: Nisshinbo Holdings Inc., Tokyo (JP)

(72) Inventors: Kazutoshi Hayakawa, Chiba-city (JP); Toshifumi Hashiba, Chiba-city (JP); Erina Matsuzaka, Chiba-city (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 795 days.

(21) Appl. No.: 18/007,852

(22) PCT Filed: May 7, 2021

(86) PCT No.: PCT/JP2021/017439

§ 371 (c)(1),
(2) Date: Dec. 2, 2022

(87) PCT Pub. No.: WO2021/246103

PCT Pub. Date: Dec. 9, 2021

(65) Prior Publication Data

US 2023/0287210 A1 Sep. 14, 2023

(30) Foreign Application Priority Data

Jun. 5, 2020 (JP) ................................ 2020-098335

(51) Int. Cl.
*C08L 67/02* (2006.01)
*C08K 5/098* (2006.01)
(Continued)

(52) U.S. Cl.
CPC .............. *C08L 67/02* (2013.01); *C08K 5/098* (2013.01); *C08K 5/20* (2013.01); *C08K 5/42* (2013.01); *C08L 5/04* (2013.01); *C08L 2201/06* (2013.01)

(58) Field of Classification Search
CPC ........ C08L 67/02; C08L 5/04; C08L 2201/06; C08K 5/098; C08K 5/20; C08K 5/42
See application file for complete search history.

(56) References Cited

U.S. PATENT DOCUMENTS 3,989,657 A 11/1976 Lohr, Jr. et al.
4,482,701 A 11/1984 Yamamori et al.
(Continued)

FOREIGN PATENT DOCUMENTS

CA 2196336 A1 2/1996
EP 0 213 466 A2 3/1987
(Continued)

OTHER PUBLICATIONS

Pure Appl. Chem. 2012, 84, 377-410 (Vert et al.) (Year: 2012).*
(Continued)

*Primary Examiner* — Amy C Bonaparte
*Assistant Examiner* — Derek Rhoades
(74) *Attorney, Agent, or Firm* — WHDA, LLP

(57) ABSTRACT

Provided is a biodegradation accelerator for accelerating the biodegradation of resins, etc. in the ocean. This marine-biodegradation accelerator comprises a compound including anions of one or more kinds including an anion having six or more carbon atoms and three or more oxygen atoms and a metal cation having a valence of two or higher, the anions and the cation being bonded by ionic bonding. A group of particles of the compound forms a contact angle of 30° or larger 30 seconds after a waterdrop is dropped thereonto.

15 Claims, 3 Drawing Sheets

(51) Int. Cl.

| | |
|---|---|
| ***C08K 5/20*** | (2006.01) |
| ***C08K 5/42*** | (2006.01) |
| ***C08L 5/04*** | (2006.01) |

(56) References Cited

U.S. PATENT DOCUMENTS

| | | | |
|---|---|---|---|
| 4,499,223 | A | 2/1985 | Yamamori et al. |
| 5,045,591 | A | 9/1991 | Meyer et al. |
| 2007/0232730 | A1 | 10/2007 | Itagaki et al. |
| 2007/0292643 | A1 | 12/2007 | Renn |
| 2012/0208928 | A1 | 8/2012 | Chen et al. |
| 2013/0274188 | A1 | 10/2013 | Yi et al. |
| 2018/0208478 | A1 | 7/2018 | Rabaioli |
| 2019/0023909 | A1 | 1/2019 | Price et al. |
| 2020/0207917 | A1 | 7/2020 | Kaneko et al. |
| 2022/0127435 | A1 | 4/2022 | Hayakawa et al. |
| 2023/0287210 | A1 | 9/2023 | Hayakawa et al. |

FOREIGN PATENT DOCUMENTS

| | | | |
|---|---|---|---|
| EP | 3922666 | A1 | 12/2021 |
| JP | 58-67761 | A | 4/1983 |
| JP | 62-70420 | A | 3/1987 |
| JP | 4-198114 | A | 7/1992 |
| JP | 9-272796 | A | 10/1997 |
| JP | 10-504335 | A | 4/1998 |
| JP | 10-168177 | A | 6/1998 |
| JP | 2000-281805 | A | 10/2000 |
| JP | 2003-292609 | A | 10/2003 |
| JP | 2003-327693 | A | 11/2003 |
| JP | 2004-18680 | A | 1/2004 |
| JP | 2005-001984 | A | 1/2005 |
| JP | 2005-001985 | A | 1/2005 |
| JP | 2005-097075 | A | 4/2005 |
| JP | 2005-272698 | A | 10/2005 |
| JP | 2006-104450 | A | 4/2006 |
| JP | 2007-63514 | A | 3/2007 |
| JP | 2007-161560 | A | 6/2007 |
| JP | 2008-174615 | A | 7/2008 |
| JP | 2008-231324 | A | 10/2008 |
| JP | 2009-541502 | A | 11/2009 |
| JP | 2012-205506 | A | 10/2012 |
| JP | 2013-503921 | A | 2/2013 |
| JP | 2013-515833 | A | 5/2013 |
| JP | 2017-523952 | A | 8/2017 |
| JP | 2019-510092 | A | 4/2019 |
| JP | 2020-125256 | A | 8/2020 |
| JP | 2021-95432 | A | 6/2021 |
| WO | 2019/026795 | A1 | 2/2019 |
| WO | 2020/162303 | A1 | 8/2020 |
| WO | 2021/246103 | A1 | 12/2021 |

OTHER PUBLICATIONS

JP 2000281805 A (Ogawa; IDS reference; Original Document and English language machine translation) (Year: 2000).*

JP 2004018680 A (Inoue et al.; IDS reference; English language machine translation) (Year: 2004).*

Polym. Degrad. Stab. 2018, 147, 237-244 (Chinaglia et al.) (Year: 2018).*

J. Oleo Sci. 2018, 67, 1609-1616 (Fukuoka et al.) (Year: 2018).*

Takada, "Current Status of Microplastic Pollution, International Trends and Countermeasures", Journal of Material Cycles and Waste Management, 2018, vol. 29, No. 4, pp. 261-269, cited in Specification, w/English translation (23 bages).

Ebisui et al., "Degradation of Biodegradable Plastics in Seawater", Fisheries Engineering, 2003, vol. 40 No. 2, pp. 143-149, cited in Specification, w/English translation (21 pages).

International Search Report dated Jun. 29, 2021, issued in counterpart International Application No. PCT/JP2021/017439 (2 pages).

Office Action dated Nov. 28, 2023, issued in counterpart CN Application No. 202180040446.5. (8 pages).

Extended (Supplementary) European Search Report dated May 15, 2024, issued to counterpart EP Application No. 21817391.2. (12 pages).

Liu, Y. et al., Metal dicarboxylates as thermal stabilizers for PVC, Polymer Degradation and Stability, Barking, GB, vol. 92, No. 8, Aug. 6, 2007, pp. 1565-1571. (7 pages).

Santhoskumar, A., A New Synthesized of Ferrous Ricinoleate Mixed with Maleic Dextrose Additive to Enhance Photo and Biodegradation Characteristics of LDPE, Journal of Inorganic and Organometallic Polymers and Materials, vol. 24, No. 3, Nov. 29, 2013, pp. 501-507. (7 pages).

Gonsalves et al., "Development of Potentially Degradable Materials for Marine Applications. II. Polypropylene-Starch Blends", Journal of Applied Polymer Science, 1991, vol. 43, pp. 405-415, cited in ISR (11 pages).

Alvarez-Zeferino et al., "Degradation of Plastics in Seawater in Laboratory", Open Journal of Polymer Chemistry, 2015, 5, pp. 55-62, cited in ISR (8 pages).

Subramaniam et al., "Enhanced degradation properties of polypropylene integrated with iron and cobalt stearates and its synthetic application", Journal of Applied Polymer Science, 2018, 46028, cited in ISR (11 pages).

Ohtake et al., "Development of Biodegradable LDPE Compound and the Estimation of Its Biodegradability and Its Application to Field of Civil Engineering", Nippon Kagaku Kaishi, 1996, No. 10, pp. 853-860, cited in ISR, w/English partial translation (8 pages).

Gutierrez-Villarreal et al., "A Comparative Study of the Photodegradation of Two Series of Cyclic Olefin Copolymers", International Journal of Polymer Science, 2017, vol. 2017, Article ID 1870814, pp. 1-10, cited in ISR (11 pages).

International Search Report dated Feb. 15, 2022, issued in counterpart International Application No. PCT/JP2021/043924 (3 pages).

International Search Report dated Feb. 22, 2022, issued in counterpart International Application No. PCT/JP2021/043935 (4 pages).

International Searching Authority, "International Search Report," issued in connection with International Patent Application No. PCT/JP2022/043518, dated Jan. 24, 2023. Cited in related U.S. Appl. No. 18/712,556.

International Searching Authority, "Written Opinion," issued in connection with International Patent Application No. PCT/JP2022/043518, dated Jan. 24, 2024. Cited in related U.S. Appl. No. 18/712,556.

* cited by examiner

MARINE-BIODEGRADATION ACCELERATOR

TECHNICAL FIELD

This invention relates to a marine biodegradation accelerator.

BACKGROUND ART

Environmental contamination by microplastics (marine contamination) and the harmful effects of microplastics on ecosystems have become a problem in recent years, and so various efforts are starting to be made to reduce the burden of microplastics on the environment. Noteworthy among these is the development and widespread adoption of biodegradable plastics.

Common biodegradable plastics exhibit a high biodegradability in environments such as soils and sludge where there is an abundance of microorganisms to carry out decomposition. However, decomposition does not readily take place in environments such as the oceans where the concentration of microorganisms is extremely low (Non-Patent Document 1). Even with resins such as polycaprolactone (PCL) and polyhydroxyalkanoates (PHA) for which biodegradability in the oceans has been reported, the rate of degradation has been found to differ widely depending on the type of seawater and is reportedly affected by a variety of factors, such as the presence/absence and cell count of resin-degrading bacteria in seawater, and the salinity, pH, water temperature, dissolved oxygen concentration and dissolved organic carbon level of the seawater. (Non-Patent Document 2).

Hence, there exists a desire for the development of materials which reliably decompose in any type of seawater, and materials which are capable of serving as degradation accelerators for resins that do not readily decompose in seawater.

PRIOR ART DOCUMENTS

Non-Patent Documents

Non-Patent Document 1: Takada, H., "Cunent status of microplastics contamination—International trends and countenneasures," *Haikibutsu Shigen Jnkan Gakkaishi*, Vol. 29, No. 4, pp. 261-269 (2018).

Non-Patent Document 2: Ebisui, A., et al., "Degradation of biodegradable plastics in seawater," *Suisan Kogyo*, Vol. 40. No. 2. pp. 143-149 (2003).

SUMMARY OF INVENTION

Technical Problem

It is therefore an object of the present invention to provide a biodegradation accelerator for accelerating the biodegradation of plastics and the like, particularly in the oceans.

Solution to Problem

The inventors have conducted intensive investigations aimed at achieving the above object. As a result, they have discovered that a material composed of a specific hydrophobic compound which contains one or more anion, including an anion having six or more carbon atoms and three or more oxygen atoms, and a metal cation having a valence of two or more and in which the anion and the cation are bonded together via an ionic bond, in spite of not dissolving in fresh water and being hydrophobic, gradually dissolves in seawater. Unlike common biodegradable resins, primary degradation (to smaller molecules) in seawater proceeds not by way of major decomposition by hydrolysis, enzymes and microorganisms but rather via molecular cleavage by metallic ions such as sodium. Hence, regardless of the type of seawater, this material undergoes stable primary degradation and is converted to smaller molecules having structures which dissolve in or are compatible with seawater, in this way greatly promoting decomposition by hydrolysis, enzymes and microorganisms. The inventors have also found that by using this material in combination with a resin, particularly a biodegradable resin, the material is the first to undergo primary degradation in seawater and has (1) the effect of forming holes in the resin material, increasing the specific surface area of the resin, and stimulating the growth of microorganisms which carry out degradation, and (2) the effect of, owing to primary degradation, accelerating secondary degradation. i.e., major decomposition by microorganisms. As a result, the biodegradation of resin materials in the oceans can be accelerated. This discovery ultimately led to the present invention.

Accordingly, the invention provides the following marine biodegradation accelerator.

1. A marine biodegradation accelerator that includes a compound which contains one or more anion, including an anion having six or more carbon atoms and three or more oxygen atoms, and a metal cation having a valence of two or more, the anion and the cation being bonded together via an ionic bond,
   wherein the compound has a contact angle of 30° or more when 30 seconds have elapsed after a water droplet is placed on particles made of the compound.
2. The marine biodegradation accelerator of 1 above, wherein the accelerator has a water absorption per 100 g and an oil absorption per 100 g such that the water absorption is lower than the oil absorption.
3. The marine biodegradation accelerator of 1 or 2 above wherein, at 25° C., the accelerator is insoluble in water and soluble in a 3 wt % aqueous solution of sodium chloride.
4. The marine biodegradation accelerator of any of 1 to 3 above wherein, letting SD1 be the percent transmittance of 560 nm wavelength light by the accelerator 168 hours after being dispersed to a concentration of 0.1 wt % in a 3 wt % aqueous solution of sodium chloride and WD1 be the percent transmittance of 560 nm wavelength light by the accelerator at room temperature 24 hours after being dispersed in water to a concentration of 0.1 Wt %, the ratio WD1/SD1 is not more than 0.9.
5. The marine biodegradation accelerator of any of 1 to 4 above, wherein the accelerator is in the form of particles.
6. The marine biodegradation accelerator of any of 1 to 5 above, wherein the metal cation is of at least one type selected from the group consisting of calcium, magnesium, aluminum, zinc, iron, copper and barium ions.
7. The marine biodegradation accelerator of any of 1 to 6 above, wherein the anion having six or more carbon atoms and three or more oxygen atoms comes from a water-soluble anionic polymer.
8. The marine biodegradation accelerator of 7 above, wherein the accelerator is obtained by subjecting a crosslinked polymer comprised of the water-soluble anionic polymer and a metal cation having a valence of two or more to hydrophobization.

9. The marine biodegradation accelerator of 7 or 8 above, wherein the water-soluble anionic polymer has at least one anionic functional group selected from the group consisting of carboxyl, hydroxyl, sulfonic acid, sulfate and phosphate ester groups, and also anionic functional groups having a structure in which a hydrogen atom on any of these groups is substituted with a monovalent metal.

10. The marine biodegradation accelerator of 9 above, wherein hydrophobization is carried out using at least one hydrophobizing agent selected from the group consisting of monovalent carboxylic acid salts, monovalent amino acid derivative salts, monovalent sulfate ester salts, monovalent sulfonic acid salts, monovalent phosphate ester salts and monovalent lactic acid ester salts.

11. The marine biodegradation accelerator of any of 1 to 6 above, wherein the anion having six or more carbon atoms and three or more oxygen atoms is a monovalent anion having six or more carbon atoms and three or more oxygen atoms or an anion having two monovalent anionic substituents which has six or more carbon atoms and three or more oxygen atoms.

12. A resin composition which includes the marine biodegradation accelerator of any of 1 to 11 above and a resin.

13. The resin composition of 12 above, wherein the resin is a biodegradable resin.

14. A molded or formed body obtained from the resin composition of 12 or 13 above.

15. A surface modifier which includes the marine biodegradation accelerator of any of 1 to 11 above.

Advantageous Effects of Invention

Because the marine biodegradation accelerator of the invention dissolves in seawater, the biodegradation within the oceans of compositions and formed bodies containing the accelerator is accelerated, making this useful as a countermeasure for marine pollution. By using the marine biodegradation accelerator of the invention, compositions and molded or formed bodies that are friendly to the environment can be obtained.

DESCRIPTION OF EMBODIMENTS

[Marine Biodegradation Accelerator]

Figure 1:
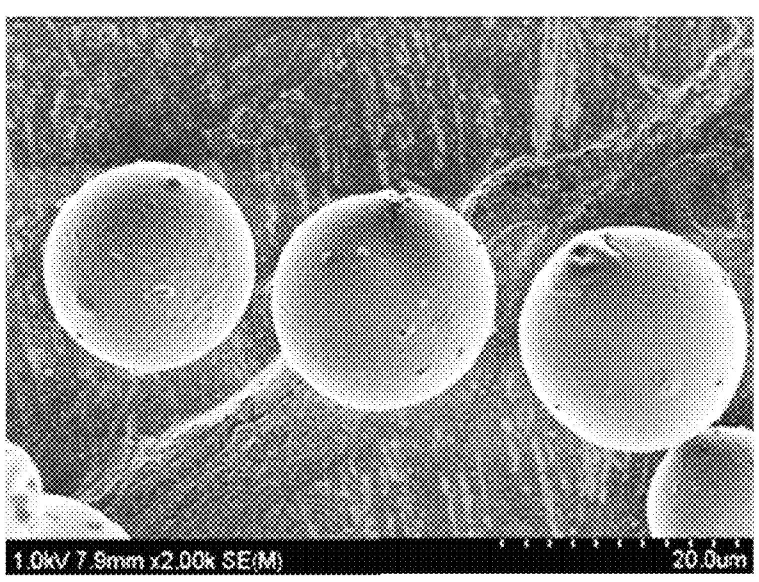
FIG. 1 shows a scanning electron micrograph (2,000×) of the Hydrophobic Alginic Acid Particles A1 obtained in Example 1-1.

The marine biodegradation accelerator of the invention is a biodegradation accelerator that includes a compound which contains one or more anion, including an anion having six or more carbon atoms and three or more oxygen atoms, and a metal cation having a valence of two or more, and in which the anion and the cation are bonded together via an ionic bond. The biodegradation accelerator has a contact angle of 30° or more when 30 seconds have elapsed after a water droplet is placed on particles made of the compound.

Here, the advantageous effects of hydrophobization and the solubility and degradability within the environment are fully exhibited. To more readily obtain these effects, the contact angle is, in order of increasing preference, 40° or more, 50° or more, 60° or more, 70° or more, or even 80° or more. Although there is no particular upper limit in the contact angle, the contact angle is realistically, in order of increasing preference, 170° or less, 160° or less, 150° or less, or even 140° or less. Taking into account, for example, the practical hydrophobic effect and the time required for dissolution and biodegradation in seawater, the contact angle preferably falls within the range of 40° to 160°, more preferably falls within the range of 50° to 150°, even more preferably falls within the range of 60° to 140°, and most preferably falls within the range of 70° to 130°. In this invention, the contact angle refers to the angle of contact 30 seconds after a water droplet is dropped onto particles of the marine biodegradation accelerator that have been uniformly applied in an amount of 1 mg/cm$^2$ onto a flat plate The contact angle can be measured using a contact angle meter (e.g., Drop Master 300, from Kyowa Interface Science Co., Ltd.).

The marine biodegradation accelerator preferably has a water absorption per 100 g, denoted as Aw (mL/100 g), and an oil absorption per 100 g, denoted as Ao (mL/100 g), such that the water absorption is lower than the oil absorption ($Aw/Ao<1$). By satisfying the condition $Aw/Ao<1$, at the time of use the biodegradation accelerator exhibits hydrophobic effects and maintains a water-insoluble state but gradually dissolves in seawater (salt water) and is more readily degraded by microorganisms. For such effects to be easily achieved, it is more preferable for $Aw/Ao \leq 0.75$, even more preferable for $Aw/Ao \leq 0.65$, and most preferable for $Aw/Ao \leq 0.5$.

Water absorption by the marine biodegradation accelerator is preferably 100 mL/100 g or less, more preferably 80 mL/100 g or less, even more preferably 60 mL/100 g or less, and most preferably 50 mL/100 g or less. At a water absorption of 100 mL/100 g or less, the marine biodegradation accelerator may be used favorably in the same way as applications for existing general-purpose polymer particles such as acrylics and nylon. The water absorption has a lower limit which, in order to readily achieve the above effects, is preferably 1 mL/100 g or more, more preferably 5 mL/100 g or more, and even more preferably 10 mL/100 g or more.

The marine biodegradation accelerator has an oil absorption which is preferably mL/100 g or more, more preferably 50 mL/100 g or more, and even more preferably 70 mL/100 g or more. At an oil absorption of 35 mL/100 g or more, in cosmetics applications, the accelerator has a good compatibility with oils, increasing its dispersibility, in addition to which the stability of emulsions and creams rises. To readily obtain such effects, the oil absorption upper limit is preferably not more than 200 mL/100 g, more preferably not more than 150 mL/100 g, and even more preferably not more than 130 mL/100 g.

The water absorption and oil absorption can be adjusted by changing, for example, the type and amount of the subsequently described hydrophobizing agent. In this invention, the oil absorption is a value measured by the boiled linseed oil method described in JIS K 5101. The water absorption is a value obtained by the following method. One gram of the marine degradation accelerator is placed in a 500 mL beaker, following which 200 mL of deionized water is added and the beaker contents are stirred for 30 minutes. The beaker contents are then transferred to a 500 mL centrifuge tube and centrifugation is carried out using a centrifuge. Following centrifugation, the supernatant is calmly discarded, the specimen is collected from the centrifuge tube and the weight (Ww) is measured. The specimen is then dried to a constant weight in a 105° C. dryer and the dry weight (Dw) is measured. The water absorption is calculated from the following equation.

$$\text{Water absorption (mL/100 g)}=[(Ww-Dw)/Dw]\times 100$$

Letting SD1 be the percent transmittance of 560 nm wavelength light by the marine degradation accelerator 168 hours after being dispersed to a concentration of 0.1 wt % in a 3 wt % aqueous solution of sodium chloride and WD1 be the percent transmittance of 560 nm wavelength light by the marine degradation accelerator 24 hours after being dispersed in water to a concentration of 0.1 wt %, the ratio WD1/SD1 is preferably not more than 0.9, more preferably not more than 0.8, and even more preferably not more than 0.5. At 0.9 or less, the shape of the marine biodegradation accelerator particles changes and the phenomenon of increasing clarification as dissolution proceeds can be confirmed. Although WD1/SD1 has no particular lower limit, this ratio is typically at least about 0.1.

When increasing dissolution cannot be confirmed within about 168 hours, the role as a marine degradation accelerator cannot be fulfilled. For example, in the oceans, owing to concerns over environmental contamination (marine contamination) and over the adsorption of chemical substances and their harmful effects on ecosystems, there are cases where it is undesirable for these to maintain a particulate shape for too long a period of time. Hence, out of consideration for the environmental impact and from the standpoint of the biodegradation accelerating effects, it is preferable for at least the condition WD1/SD1 0.9 to be satisfied after about 168 hours.

The marine biodegradation accelerator of the invention is preferably in the form of particles. In the case of particles composed of the marine biodegradation accelerator, the average particle size is preferably not more than 5 mm and, in order to increasing preference, more preferably not more than 1 mm, not more than 500 μm, not more than 100 μm, not more than 60 μm, not more than 30 μm, not more than 15 μm, or not more than 10 μm. The lower limit is preferably 0.1 μm, more preferably 0.5 μm, and even more preferably 1.0 μm. The average particle size in this invention is the mean volume particle diameter (MV) obtained by the laser diffraction/scattering method.

In cases where the marine degradation accelerator is in the form of particles, the particles, although not particularly limited, may be physically or chemically shape-controlled particles that are, for example, spherical, approximately spherical, flattened or recessed, or may be physically pulverized particles. From the standpoint of the feel, slip characteristics and control of the particle size distribution, particles that are physically or chemically shape-controlled, such as spherical, approximately spherical, flattened or recessed particles, are preferred. Alternatively, particles composed of the marine biodegradation accelerator may be rendered into the shape of pellets by compression molding or melt molding.

The metal cation is not particularly limited. Examples include calcium, magnesium, aluminum, zinc, iron, copper, barium, platinum, gold, strontium, radium, nickel, cobalt and manganese ions. Of these, calcium, magnesium, aluminum, zinc, iron, copper and barium ions are preferred. Taking into account the solubility and environmental considerations, calcium ions and magnesium ions are more preferred.

The marine biodegradation accelerator of the invention is divided into ones obtained by subjecting a crosslinked polymer containing, as the anion, a water-soluble anionic polymer having six or more carbon atoms and three or more oxygen atoms and a metal cation having a valence of two or more to hydrophobizing treatment (also referred to below as "hydrophobized polymers"); and ones obtained by bonding an anion having six or more carbon atoms and three or more oxygen atoms with a metal cation having a valence of two or more (also referred to below as a "hydrophobized compounds"). Specific embodiments of these are described below.

[Hydrophobized Polymers]

In a first embodiment, the inventive marine biodegradation accelerator of the invention is made of a hydrophobized polymer obtained by subjecting a crosslinked polymer containing a water-soluble anionic polymer and a metal cation having a valence of two or more to hydrophobizing treatment. The raw material for the water-soluble anionic polymer is from biomass. Because they have biodegradable structures, compounds from natural polymers in particular are most suitable.

Preferred examples of the water-soluble anionic polymer include at least one type of polysaccharide monovalent salt selected from among monovalent salts of alginic acid, such as sodium alginate, potassium alginate and ammonium alginate; monovalent salts of carboxymethylcellulose (CMC), such as sodium CMC, potassium CMC and ammonium CMC; monovalent salts of modified starches, such as starch sodium octenyl succinate and starch sodium glycolate; monovalent salts of hyaluronic acid such as sodium hyaluronate; monovalent salts of chondroitin sulfuric acid, such as sodium chondroitin sulfate; and also monovalent salts of glycosaminoglycan derivatives, monovalent salts of cellulose derivatives, monovalent salts of starch derivatives, monovalent salts of chitosan derivatives and monovalent salts of chitin derivatives. Examples of the metal cation having a valence of two or more include the same as those mentioned above.

Examples of the crosslinked polymer include polyvalent metal salts of alginic acids, such as calcium alginate, strontium alginate, magnesium alginate, barium alginate, radium alginate, lead alginate, zinc alginate, nickel alginate, iron alginate, copper alginate, cadmium alginate, cobalt alginate and manganese alginate; polyvalent metal salts of CMC, such as calcium CMC; polyvalent metal salts of modified starches, such as starch calcium octenyl succinate, starch calcium glycolate and starch aluminum octenyl succinate;

and polyvalent metal salts of chondroitin sulfuric acid, such as calcium chondroitin sulfate.

The compound used in hydrophobizing treatment (also referred to below as the "hydrophobizing agent") is preferably a salt compound having an anion with six or more carbon atoms. The number of carbons on the anion is more preferably ten or more, and even more preferably 12 or more. Although there is no particular upper limit in the number of carbon atoms on the anion, the number of carbons is preferably not more than 30, more preferably not more than 25, and even more preferably not more than 20. This salt compound is preferably a salt compound having a monovalent cation, and more preferably a salt compound having a monovalent metal cation. Also, the salt compound is preferably one which dissolves in water at room temperature or at up to 80° C. Such a compound has a good compatibility with seawater, enabling a good biodegradation rate to be obtained. At least one entity selected from carboxyl groups, ester bonds, sulfone groups, ether bonds and amide bonds is preferably included as a hydrophilic group.

Specific examples of the hydrophobizing agent include carboxylic acid salts, amino acid derivative salts, sulfate ester salts, sulfonic acid salts, phosphate ester salts and lactic acid ester salts. The hydrophobizing agent, when designed out of environmental concerns so as to fully satisfy the solubilities in fresh water and salt water and the microbial degradability in the environment, has a molecular weight of preferably 5,000 or less, more preferably from 50 to 1,000, even more preferably from 100 to 600, and most preferably from 200 to 500. In this invention, when used in connection with a polymer, "molecular weight" refers to the number-average molecular weight (Mn), Mn being a polystyrene-equivalent measured value obtained by gel permeation chromatography. When used in connection with substances other than polymers, "molecular weight" refers to the chemical formula weight.

The carboxylic acid salt is preferably a salt of a carboxylic acid having from 6 to 30 carbon atoms, more preferably a salt of a carboxylic acid having from 10 to 25 carbon atoms, and even more preferably a salt of a carboxylic acid having from 12 to 20 carbon atoms. The carboxylic acid salt may be a salt of a monocarboxylic acid, or may be a salt of a polycarboxylic acid.

Specific examples of monocarboxylic acids include caproic acid, enanthoic acid, caprylic acid, octanoic acid, pelargonic acid, capric acid, undecylenic acid, lauric acid, myristic acid, pentadecylic acid, palmitic acid, palmitoleic acid, margaric acid, stearic acid, isostearic acid, oleic acid, vaccenic acid, ricinolic acid, linoleic acid, linolenic acid, eleostearic acid, oxystearic acid, ricinolic acid, arachidic acid, mead acid, arachidonic acid, eicosapentaenoic acid, behenic acid, docosahexaenoic acid, lignoceric acid, nervonic acid, cerotic acid, montanic acid, melissic acid, coconut oil fatty acids and palm oil fatty acids. Isomers of these having branched structures may also be used.

Specific examples of polycarboxylic acids include dicarboxylic acids such as octanedioic acid (suberic acid), nonanedioic acid (azelaic acid), decanedioic acid (sebacic acid), undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid and eicosanedioic acid. Isomers of these having branched structures and polycarboxylic acids having a valence of three or more may also be used.

The salts of monovalent carboxylic acids are preferably monovalent metal salts. Specific examples include caprylic acid salts such as potassium caprylate and sodium caprylate; octanoic acid salts such as potassium octanoate and sodium octanoate; pelargonic acid salts such as potassium pelargonate and sodium pelargonate; capric acid salts such as potassium caprate and sodium caprate; undecylenic acid salts such as potassium undecylenate and sodium undecylenate; lauric acid salts such as potassium laurate and sodium laurate; myristic acid salts such as potassium myristate and sodium myristate; pentadecylic acid salts such as potassium pentadecylate and sodium pentadecylate; palmitic acid salts such as potassium palmitate and sodium palmitate; margaric acid salts such as potassium margarate and sodium margarate; stearic acid salts such as lithium stearate and sodium stearate; isostearic acid salts such as potassium isostearate and sodium isostearate; oleic acid salts such as potassium oleate and sodium oleate; linoleic acid salts such as potassium linoleate and sodium linoleate; linolenic acid salts such as potassium linolenate and sodium linolenate; arachidonic acid salts such as potassium arachidonate and sodium arachidonate; behenic acid salts such as potassium behenate and sodium behenate; docosahexaenoic acid salts such as sodium docosahexaenoate; and coconut oil fatty acids such as potassium cocoate and sodium cocoate. Of these, carboxylic acid salts having from 10 to 20 carbon atoms, such as lauric acid salts, myristic acid salts, stearic acid salts and arachidonic acid salts are preferred.

The salts of polycarboxylic acids are preferably monovalent metal salts. Specific examples include octanedioic acid salts such as disodium octanedioate and dipotassium octanedioate; nonanedioic acid salts such as disodium nonanedioate and dipotassium nonanedioate; decanedioic acid salts such as disodium decanedioate and dipotassium decanedioate; undecanedioic acid salts such as disodium undecanedioate and dipotassium undecanedioate; dodecanedioic acid salts such as disodium dodecanedioate and dipotassium dodecanedioate; tridecanedioic acid salts such as disodium tridecanedioate and dipotassium tridecanedioate; tetradecanedioic acid salts such as disodium tetradecanedioate and dipotassium tetradecanedioate; tetradecanedioic acid salts such as disodium pentadecanedioate and dipotassium pentadecanedioate; hexadecanedioic acid salts such as disodium hexadecanedioate and dipotassium hexadecanedioate; heptadecanedioic acid salts such as disodium heptadecanedioate and dipotassium heptadecanedioate; octadecanedioic acid salts such as disodium octadecanedioate and dipotassium octadecanedioate; nonadecanedioic acid salts such as disodium nonadecanedioate and dipotassium nonadecanedioate; and eicosanedioic acid salts such as disodium eicosanedioate and dipotassium eicosanedioate. Isomers of these having branched structures and polycarboxylic acids having three or more carboxylic acid groups may also be used. Of these, dicarboxylic acid salts having from 10 to 20 carbon atoms, such as decanedioic acid salts, dodecanedioic acid salts, tetradecanedioic acid salts, hexadecanedioic acid salts, octadecanedioic acid salts and eicosanedioic acid salts are preferred.

The amino acid derivative salts are preferably ones having from 6 to 30 carbon atoms, more preferably ones having from 10 to 25 carbon atoms, and even more preferably ones having from 12 to 20 carbon atoms. The salt of the amino acid derivative is preferably a monovalent salt, and more preferably a monovalent metal salt.

Examples of the amino acid derivative include sarcosine derivatives such as capryloyl sarcosine, lauroyl sarcosine, myristoyl sarcosine, palmitoyl sarcosine and cocoyl sarcosine; glutamic acid derivatives such as capryloyl glutamic acid, lauroyl glutamic acid, myristoyl glutamic acid, palmitoyl glutamic acid, stearoyl glutamic acid, cocoyl acyl glutamic acid, cocoyl glutamic acid, acyl glutamic acid and dilauroyl glutamic acid; glycine derivatives such as lauroyl glycine, myristoyl glycine, palmitoyl glycine, palmitoyl methyl glycine, cocoyl acyl glycine and cocoyl glycine; alanine derivatives such as lauryl methyl alanine, myristoyl methyl alanine, cocoyl alanine and cocoyl methyl alanine; lysine derivatives such as lauroyl lysine, myristoyl lysine, palmitoyl lysine, stearoyl lysine, oleyl lysine and acylated lysine; aspartic acid derivatives such as lauroyl aspartate, myristoyl aspartate, palmitoyl aspartate and stearoyl aspartate; taurine derivatives such as lauroyl taurine, lauroyl methyl taurine, myristoyl taurine, myristoyl methyl taurine, palmitoyl taurine, palmitoyl methyl taurine, stearoyl taurine and stearoyl methyl taurine; and amino acid derivatives having hydrocarbon groups, such as the following proline derivatives; lauroyl proline, myristoyl proline and palmitoyl proline. N-acyl derivatives of amino acids are especially preferred.

Examples of the amino acid derivative salts include sarcosine derivative salts such as potassium capryloyl sarcosinate, sodium capryloyl sarcosinate, potassium lauroyl sarcosinate, sodium lauroyl sarcosinate, potassium myristoyl sarcosinate, sodium myristoyl sarcosinate, potassium palmitoyl sarcosinate, sodium palmitoyl sarcosinate, potassium cocoyl sarcosinate and sodium cocoyl sarcosinate; glutamic acid derivative salts such as potassium capryloyl glutamate, sodium capryloyl glutamate, potassium lauroyl glutamate, sodium lauroyl glutamate, potassium myristoyl glutamate, sodium myristoyl glutamate, sodium palmitoyl glutamate, magnesium palmitoyl glutamate, potassium stearoyl glutamate, sodium stearoyl glutamate, potassium cocoyl acyl glutamate, sodium cocoyl acyl glutamate, potassium cocoyl glutamate, sodium cocoyl glutamate, potassium acyl glutamate, sodium acyl glutamate, sodium dilauroyl glutamate lysine and sodium polyglutamate; glycine derivative salts such as potassium lauroyl glycine, sodium lauroyl glycine, potassium myristoyl glycine, sodium myristoyl glycine, sodium palmitoyl glycine, sodium palmitoyl methyl glycine, potassium cocoyl acyl glycine, sodium cocoyl acyl glycine, potassium cocoyl glycine and sodium cocoyl glycine; alanine derivative salts such as potassium lauroyl methyl alanine, sodium lauryl methyl alanine, sodium myristoyl methyl alanine, sodium cocoyl alanine and sodium cocoyl methyl alanine; aspartic acid derivative salts such as potassium lauroyl aspartate, sodium lauroyl aspartate, potassium myristoyl aspartate, sodium myristoyl aspartate, potassium palmitoyl aspartate, sodium palmitoyl aspartate, potassium stearoyl aspartate and sodium stearoyl aspartate; taurine derivative salts such as sodium lauroyl taurate, potassium lauroyl taurate, sodium lauroyl methyl taurate, potassium myristoyl taurate, sodium myristoyl taurate, sodium myristoyl methyl taurate, potassium palmitoyl taurate, sodium palmitoyl taurate, potassium palmitoyl methyl taurate, sodium palmitoyl methyl taurate, potassium stearoyl taurate, sodium stearoyl taurate and sodium stearoyl methyl taurate; and amino acid derivative salts having hydrocarbon groups, including proline derivative salts such as sodium lauroyl proline, sodium myristoyl proline and sodium palmitoyl proline. N-acyl derivative salts of amino acids are especially preferred.

Examples of the sulfate ester salts include alkyl sulfate ester salts, polyoxyethylene aryl ether sulfate ester salts, polyoxyethylene alkyl ether sulfate ester salts, polyoxyalkylene alkyl ether sulfate ester salts, polyoxyalkylene alkenyl ether sulfuric acid salts and polyoxyethylene castor oil ether sulfate ester salts. The sulfate ester salt is preferably a monovalent salt, and more preferably an ammonium salt or a monovalent metal salt.

The alkyl sulfate ester salts are preferably ones having an alkyl group of from 6 to carbon atoms, more preferably ones having an alkyl group of from 10 to 25 carbon atoms, and even more preferably ones having an alkyl group of from 12 to 20 carbon atoms. Specific examples include potassium lauryl sulfate, sodium lauryl sulfate, ammonium lauryl sulfate, potassium myristyl sulfate, sodium myristyl sulfate, ammonium myristyl sulfate, sodium cetyl sulfate, ammonium cetyl sulfate, sodium stearyl sulfate, ammonium stearyl sulfate, sodium oleyl sulfate and ammonium oleyl sulfate.

The polyoxyethylene aryl ether sulfate salts are preferably ones having a hydrophilic-lipophilic balance (HLB) of not more than 16, and more preferably ones having an HLB of not more than 12. Specific examples include polyoxyethylene polycyclic phenyl ether sulfate ester salts such as sodium polyoxyethylene polycyclic phenyl ether sulfate and ammonium polyoxyethylene polycyclic phenyl ether sulfate; and sodium polyoxyethylene aryl ether sulfates.

The polyoxyethylene alkyl ether sulfate ester salts are preferably ones having an HLB of 16 or less, and more preferably ones having an HLB of 12 or less. Specific examples include polyoxyethylene alkyl ether sulfate esters, sodium polyoxyethylene lauryl ether sulfate, ammonium polyoxyethylene lauryl ether sulfate, sodium polyoxyethylene myristyl ether sulfate, ammonium polyoxyethylene myristyl ether sulfate, sodium polyoxyethylene cetyl ether sulfate, ammonium polyoxyethylene cetyl ether sulfate, sodium polyoxyethylene stearyl ether sulfate, ammonium polyoxyethylene stearyl ether sulfate, sodium polyoxyethylene oleyl ether sulfate and ammonium polyoxyethylene oleyl ether sulfate.

The polyoxyalkylene alkyl ether sulfate ester salts are preferably ones having an HLB of 16 or less, and more preferably ones having an HLB of 12 or less. Specific examples include sulfate ester sodium salts of polyoxyethylene-polyoxypropylene block copolymers, sulfate ester sodium salts of polyoxyethylene-polyoxybutylene block copolymers and sulfate ester sodium salts of alkyl ethers of polyoxyethylene-polyoxypropylene block copolymers. The polyoxyalkylene alkenyl ether sulfuric acid salts are preferably ones having an HLB of 16 or less, and more preferably ones having an HLB of 12 or less. Specific examples include sulfate ester ammonium salts of alkenyl ethers of polyoxyethylene-polyoxyalkylene block copolymers. The polyoxyethylene castor oil ether sulfate esters and salts thereof are preferably ones having an HLB of 16 or less, and more preferably ones having an HLB of 12 or less. Specific examples include polyoxyethylene castor oil ether sulfate ester and ammonium polyoxyethylene castor oil ether sulfate ester.

The sulfonic acid salts are preferably ones having from 6 to 30 carbon atoms, more preferably ones having from 10 to 25 carbon atoms, and even more preferably ones having from 12 to 20 carbon atoms. The sulfonic acid salts are also preferably monovalent salts, and more preferably ammonium salts or monovalent metal salts. Specific examples include alkyl sulfonic acid salts such as sodium lauryl sulfonate, ammonium lauryl sulfonate, sodium myristyl sulfonate, ammonium myristyl sulfonate, sodium cetyl sulfonate, ammonium cetyl sulfonate, sodium stearyl sulfonate, ammonium stearyl sulfonate, sodium oleyl sulfonate and ammonium oleyl sulfonate; dodecylbenzene sulfonic acid salts such as ammonium dodecylbenzene sulfonate and sodium dodecylbenzene sulfonate; alkylene disulfonic acid salts such as sodium alkylene disulfonates; dialkyl succinate sulfonic acid salts such as sodium dialkyl succinate sulfonate; monoalkyl succinate sulfonic acid salts such as disodium monoalkyl succinate sulfonates; salts of naphthalene sulfonic acid formalin condensates, such as sodium salts of naphthalene sulfonic acid formalin condensates; olefin sulfonic acid salts such as sodium olefin sulfonate and ammonium olefin sulfonate; isethionic acid salts such as potassium lauroyl isethionate, sodium lauroyl isethionate, sodium myristoyl isethionate, sodium palmitoyl isethionate and sodium stearoyl isethionate; and sulfosuccinic acid salts such as sodium dihexyl sulfosuccinate, sodium dioctyl sulfosuccinate, ammonium dioctyl sulfosuccinate, sodium didecyl sulfosuccinate and sodium diisobutyl sulfosuccinate. Of these, sulfonic acid salts having alkyl groups of from 12 to 20 carbon atoms are especially preferred.

The phosphate ester salts are exemplified by alkyl phosphate ester salts.

The alkyl phosphate ester salts are preferably ones having an alkyl group of from 6 to 30 carbon atoms, more preferably ones having an alkyl group of from 10 to 25 carbon atoms, and even more preferably ones having an alkyl group of from 12 to 20 carbon atoms. Specific examples include octyl phosphoric acid salts such as potassium octyl phosphate; nonyl phosphoric acid salts such as potassium nonyl phosphate; decyl phosphoric acid salts such as potassium decyl phosphate; undecyl phosphoric acid salts such as potassium undecyl phosphate; lauryl phosphoric acid salts such as potassium lauryl phosphate; myristyl phosphoric acid salts such as potassium myristyl phosphate; cetyl phosphoric acid salts such as potassium cetyl phosphate and sodium cetyl phosphate; and stearyl phosphoric acid salts such as potassium stearyl phosphate.

The lactic acid ester salts are preferably ones having from 6 to 30 carbon atoms, more preferably ones having from 10 to 25 carbon atoms, and even more preferably ones having from 12 to 20 carbon atoms. Specific examples include sodium stearoyl lactate, potassium stearoyl lactate, sodium isostearoyl lactate and sodium lauroyl lactate.

Of these, carboxylic acid salts, amino acid derivative salts, sulfate ester salts and sulfonic acid salts are preferred as the hydrophobizing agent. In terms of the cations, salts having an organic ion and salts having a metal ion are preferred from an environmental standpoint. Preferred organic ions are monovalent organic ions such as the ammonium ion. Preferred metal ions include monovalent metal ions such as lithium, potassium, sodium and silver ions. Of these, from such standpoints as the environment, biological safety, versatility and cost, sodium, potassium and ammonium ions are preferred, sodium and potassium ions are more preferred, and sodium ions are even more preferred. With the use of such a hydrophobizing agent, the anions on the hydrophobizing agent bond via ionic bonds with some of the divalent metal ions included in the crosslinked polymer, causing the crosslinked polymer to exhibit hydrophobicity.

Additives as carboxylic acids, amino acid derivatives, organosilicon compounds, fluorine compounds, silicone compounds, sulfate esters, phosphate esters, lactic acid esters, oils, acrylic compounds, acrylic resins, titanium coupling agents, inorganic compounds, metal oxides, solid lubricants and surfactants may be added to the hydrophobizing agent, provided that doing so does not detract from the advantageous effects of the invention.

The carboxylic acid may be a monocarboxylic acid or a polycarboxylic acid. Specific examples include those mentioned above. Specific examples of the amino acid derivatives include those mentioned above.

The organosilicon compounds are exemplified by alkylated silanes having at least one alkyl group of from 6 to 30 carbon atoms, alkylated silazanes having at least one alkyl group of from 6 to 30 carbon atoms, trialkoxysilanes having at least one alkoxy group of from 6 to 30 carbon atoms, octyltrialkoxysilanes, triethoxycaprylylsilane and 3-methacryloxypropyltrimethoxysilane.

The silicone compounds are exemplified by methylhydrogenpolysiloxane, methylpolysiloxane (methicone), dimethylpolysiloxane (dimethicone), triethoxysilylethyl polydimethylsiloxyethyl dimethicone, methylphenylpolysiloxane, triethoxysilylethyl polydimethylsiloxyethyl hexyl dimethicone, cyclic silicones, crosslinked silicones, acrylic-silicone graft polymers, organic silicone resin/partially crosslinked organopolysiloxane polymers, tetramethyltetrahydrogencyclotetrasiloxane, trimethylsiloxysilicic acid, amino-modified silicones, carboxylic acid-modified silicones, fluorinated silicones, silicone gums, acrylic silicones, silicone resins, triethoxysilylethyl polydimethylsiloxyethyl dimethicone, triethoxysilylethyl polydimethylsiloxyethyl hexyl dimethicone and fluorinated silicones.

Examples of the fluorine compounds include perfluoroalkylphosphate esters, perfluoroalkylsilanes, perfluoroalkylalkoxysilanes, perfluoroalkyl group-containing esters, perfhioroalkylphosphate ester salts, perfluoropolyethers, fluorosilicones, fluorinated silicone resins, trimethoxy(3,3,3-trifluoropropyl)silane and tridecafluorooctyltriethoxysilane.

The sulfate esters are exemplified by alkyl sulfate esters, polyoxyethylene aryl ether sulfate esters, polyoxyethylene alkyl ether sulfate esters and polyoxyethylene castor oil ether sulfate esters. Alkyl sulfate esters having an alkyl group of 6 to 30 carbons are preferred. Specific examples include lauryl sulfate, myristyl sulfate, cetyl sulfate, stearyl sulfate and oleyl sulfate. The polyoxyethylene aryl ether sulfate esters are preferably ones having a HBL of 16 or less, and more preferably ones having an HLB of 12 or less. Specific examples include polyoxyethylene polycyclic phenyl ether sulfate esters and polyoxyethylene aryl ether sulfate esters. The polyoxyethylene alkyl ether sulfate esters are preferably ones having an HLB of 16 or less, and more preferably ones having an HLB of 12 or less.

The sulfonic acids are preferably ones having from 6 to 30 carbon atoms. Specific examples include alkyl sulfonic acids such as lauryl sulfonic acid, myristyl sulfonic acid, cetyl sulfonic acid, stearyl sulfonic acid and oleyl sulfonic acid; dodecylbenzene sulfonic acid, alkylene disulfonic acids; dialkyl succinate sulfonic acids; monoalkyl succinate sulfonic acids; naphthalene sulfonic acid formalin condensates; olefin sulfonic acids; isethionic acids such as lauroyl isethionic acid, myristoyl isethionic acid, palmitoyl isethionic acid and stearoyl isethionic acid; and sulfosuccinic acid.

The phosphate esters are exemplified by polyoxyalkylene alkyl ether phosphate esters and alkyl phosphate esters. The polyoxyalkylene alkyl ether phosphate esters are preferably ones having an HLB value of 16 or less, and more preferably ones having an HLB value of 12 or less. Examples include polyoxyethylene (2) stearyl ether phosphate esters.

The alkyl phosphate esters are preferably ones having an alkyl group of from 6 to 30 carbon atoms. Specific examples include octyl phosphate, nonyl phosphate, decyl phosphate, undecyl phosphate, lauryl phosphate, myristyl phosphate, cetyl phosphate and stearyl phosphate.

The lactic acid esters are exemplified by ones having from 6 to 30 carbon atoms. Specific examples include lauryl lactate, myristyl lactate, cetyl lactate, oleyl lactate and octyldodecyl lactate.

Examples of the oils include petrolatum, liquid paraffins, squalane, paraffin wax, linseed oil, cottonseed oil, coconut oil, castor oil, egg oil, lanolin fatty acids, propylene glycol dicaprate, glyceryl trioctanoate, cetyl 2-ethylhexanoate, isocetyl stearate, stearyl alcohol, cetyl alcohol, oleyl alcohol, beef tallow, beeswax, spermaceti, Japan wax, lanolin, carnauba wax and candelilla wax.

Examples of the acrylic compounds include alkyl (meth) acrylates. Examples of the acrylic resins include copolymers of (meth)acrylic acid and styrene compounds, as well as salts thereof; copolymers of (meth)acrylic acid and (meth) acrylate ester compounds, as well as salts thereof; copolymers of (meth)acrylic acid and vinyl ester compounds, as well as salts thereof; copolymers of (meth)acrylic acid and olefin compounds, as well as salts thereof; and copolymers of (meth)acrylic acid and conjugated diene compounds, as well as salts thereof.

Examples of the titanium coupling agents include alkyl titanates, pyrophosphoric acid titanates, phosphonic acid titanates and amino acid titanates.

An example of the inorganic compounds is alumina. An example of the metal oxides is titanium oxide.

Examples of the solid lubricants include polyolefin waxes (e.g., polyethylene wax), paraffin waxes (e.g., synthetic paraffins, natural paraffins), fluoropolymer waxes (e.g., polytetrafluoroethylene), fatty amide compounds (e.g., stearamide, palmitamide), metal sulfides (e.g., molybdenum disulfide, tungsten disulfide), graphite, graphite fluoride, boron nitride, polyalkylene glycols and alkali metal sulfates.

Methods for producing the hydrophobized polymer particles of the invention include the following.

(1) A method which includes the step of hydrophobizing particles of a crosslinked polymer that is a polyvalent metal salt of a water-soluble anionic polymer (Method 1).

(2) A method which includes the step of spray-drying a solution containing a monovalent salt of a water-soluble anionic polymer and a hydrophobizing agent to obtain particles, and the step of carrying out crosslinking treatment on the particles using a polyvalent metal salt and at the same time carrying out hydrophobization (Method 2).

(3) A method which includes the step of forming a water-in-oil emulsion which contains a monovalent salt of a water-soluble anionic polymer and a hydrophobizing agent in water droplets, and the step of carrying out crosslinking treatment using a polyvalent metal salt and at the same time carrying out hydrophobization (Method 3).

(4) A method which includes the step of adding dropwise a polyvalent metal salt solution to a medium in which a monovalent salt of a water-soluble anionic polymer and a hydrophobizing agent dissolve, and carrying out crosslinking treatment while at the same time carrying out hydrophobization; or a method which includes the step of adding dropwise a liquid in which a monovalent salt of a water-soluble anionic polymer and a hydrophobizing agent are dissolved to a medium in which a polyvalent metal salt dissolves, and carrying out crosslinking treatment while at the same time carrying out hydrophobization (Method 4).

Method 1 includes the step of hydrophobizing particles of a crosslinked polymer that is a polyvalent metal salt of a water-soluble anionic polymer. The crosslinked polymer particles can be produced by a known method. For example, as described in JP-A H05-222208, the particles can be produced by spray-drying a solution in which a monovalent salt of a water-soluble anionic polymer is dissolved to form particles, and then carrying out crosslinking treatment using a polyvalent metal salt. The monovalent salt of the water-soluble anionic polymer and the polyvalent metal salt are subsequently described.

The hydrophobized polymer can be produced by forming a water-in-oil (W/O) emulsion that contains a monovalent salt of a water-soluble anionic polymer in water, and then carrying out crosslinking treatment using a polyvalent metal salt. An example of a method for forming the W/O emulsion involves first preparing a solution (Solution A) of a monovalent salt of a water-soluble anionic polymer dissolved in water or a mixed solvent of water and a hydrophilic organic solvent. If necessary, heating may be carried out at this time. Next, Solution A and a hydrophobic organic solvent are mixed together, and then emulsified using an agitator, homogenizer or the like. At the time of mixture, Solution A may be added to the hydrophobic organic solvent, or the hydrophobic organic solvent may be added to Solution A.

At this time, instead of the hydrophobic organic solvent, a Solution B of a surfactant or a polymer stabilizer dissolved in the hydrophobic organic solvent may be used to control the particle size of the water droplets in the W/O emulsion. In this case. Solution A and Solution B are mixed together and are then emulsified using an agitator, homogenizer or the like. At the time of mixture, Solution A may be added to Solution B, or Solution B may be added to Solution A.

Another example of a method of forming the W/O emulsion is to charge a container all at once with a monovalent salt of a water-soluble anionic polymer, water, surfactant, hydrophobic organic solvent and other necessary ingredients, and then carry out emulsification using an agitator, homogenizer or the like.

Crosslinking treatment may be carried out by adding a polyvalent metal salt-containing solution to the W/O emulsion and stirring. Alternatively, it may be carried out by adding the W/O emulsion to a polyvalent metal salt-containing solution and stirring. Use can be made of the same polyvalent metal salt-containing solution as that described subsequently in the explanation of Method 2.

If necessary, crosslinking treatment may be carried out under heating. Heating may be carried out when adding the polyvalent metal salt-containing solution to the dispersion, may be carried out during stirring following such addition, or may be carried out at both of these times. The heating temperature is preferably between 10° C. and 100° C., and more preferably between 15° C. and 80° C. The treatment time is preferably from 0.5 to 24 hours, and more preferably from 1 to 12 hours.

After crosslinking treatment, washing and drying of the particles may be optionally carried out to give the crosslinked polymer particles. Washing may be carried out by an ordinary method, such as that of removing the solvent following crosslinking treatment, adding water and centrifugal separation. Drying may be carried out by an ordinary method such as spray drying, vacuum drying or freeze drying.

It is also possible to use a commercial product as the crosslinked polymer particles. Examples include alginic acid particles such as Fravikafine® (from Nisshinbo Chemical Inc.) and the calcium alginate CA series from Kimika Corporation.

The method of hydrophobizing the crosslinked polymer particles is exemplified by a method in which the hydrophobizing agent is dissolved in a solvent, following which the crosslinked polymer particles are added to the solution and dispersed, thereby causing the hydrophobizing agent to deposit on the surface of the particles or both on the surface and at the interior of the particles. At this time, where necessary, deposition can be made to efficiently proceed by carrying out heating or concentration. When heating is carried out, the temperature is preferably between 10° C. and 100° C., and more preferably between 30° C. and 80° C. Concentration may be carried out by, for example, heating the reaction system and removing the solvent that evaporates. The hydrophobizing treatment time is preferably from 0.5 to 24 hours, and more preferably from 1 to 12 hours.

The solvent may be suitably selected from among those solvents which are able to disperse the crosslinked polymer particles and can dissolve the hydrophobizing agent that is to be used. Illustrative examples include water; alcohols such as methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, I-hexanol, 2-methyl-1-pentanol, 4-methyl-2-pentanol, 2-ethylbutanol, I-heptanol, 2-heptanol, 3-heptanol, 2-octanol, 2-ethyl-1-hexanol, benzyl alcohol and cyclohexanol; polyhydric alcohols such as ethylene glycol, propylene glycol, diethylene glycol, dipropylene glycol, glycerin, triethylene glycol, tetraethylene glycol, hexylene glycol, methyl carbitol, ethyl carbitol and butyl carbitol; ether alcohols such as methyl cellosolve, ethyl cellosolve, isopropyl cellosolve, butyl cellosolve and diethylene glycol monobutyl ether; ketones such as acetone, methyl ethyl ketone, methyl isobutyl ketone and cyclohexanone; esters such as ethyl acetate, butyl acetate, ethyl propionate and cellosolve acetate; aliphatic or aromatic hydrocarbons such as pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexyl, benzene, toluene, xylene and ethylbenzene; halogenated hydrocarbons such as carbon tetrachloride, trichloroethylene, chlorobenzene and tetrabromoethane; ethers such as diethyl ether, dimethyl ether, trioxane and tetrahydrofuran; acetals such as methylal and diethylacetal; carboxylic acids such as formic acid, acetic acid and propionic acid; acetals such as methylal and diethyl acetal; the following linear, branched or cyclic silicone oils and copolymers thereof: dimethylpolysiloxanes such as hexamethylcyclotrisiloxane (D3), octamethylcyclotetrasiloxane (D4), decamethylcyclopentasiloxane (D5), dodecamethylcyclohexasiloxane (D6), tetradecamethylcycloheptasiloxane (D7), hexamethyldisiloxane, octamethyltrisiloxane and decaethyltetrasiloxane, and also methyltrimethicone, methylphenylpolysiloxane, diphenylpolysiloxane, diphenylsiloxyphenyltrimethicone, trimethylsiloxyphenyldimethicone, caprylyhnethicone and cetyldimethicone; sulfur or nitrogen-containing organic compounds such as nitropropene, nitrobenzene, dimethylamine, monoethanolamine, pyridine, dimethylformamide, dimethylsulfoxide, N-methyl-2-pyrrolidone and acetonitrile; and ionic liquids. These solvents may be of one type used alone or two or more may be used in admixture.

The hydrophobizing agent used may be one that is mentioned above. When a carboxylic acid salt or amino acid derivative salt in particular is used as the hydrophobizing agent, this gives rise to ion exchange with at least some of the ion-crosslinked polyvalent metal ions and chemical bonding with the hydrophobizing agent takes place. Monodisperse crosslinked particles of strengthened hydrophobicity can thus be obtained following treatment, which is desirable.

Hydrophobizing treatment is carried out such that the weight ratio between the crosslinked polymer particles and the hydrophobizing agent in the solvent, expressed as "crosslinked polymer particles:hydrophobizing agent," is preferably from 99.9:0.1 to 70:30, more preferably from 99.5:0.5 to 80:20, even more preferably from 99:1 to 85:15, and still more preferably from 98:2 to 90:10.

Following hydrophobization, if necessary, the particles are washed and dried, thereby obtaining hydrophobized polymer particles. Washing may be carried out by an ordinary method, such as that of, for example, removing the solvent following hydrophobization, adding water and centrifugal separation. Drying may be carried out by an ordinary method such as spray drying, vacuum drying or freeze drying.

Method 2 includes the step of spray-drying a solution containing a monovalent salt of a water-soluble anionic polymer and a hydrophobizing agent to obtain particles, and the step of carrying out crosslinking treatment on the particles using a polyvalent metal salt and at the same time carrying out hydrophobization.

The monovalent salt of the water-soluble anionic polymer may be an inorganic salt or may be an organic salt. Examples include monovalent salts of alginic acid, such as sodium alginate, potassium alginate and ammonium alginate; carboxymethylcellulose (CMC) monovalent salts such as sodium CMC, potassium CMC and ammonium CMC; monovalent salts of modified starch, such as starch sodium octenyl succinate and starch sodium glycolate; monovalent salts of hyaluronic acid, such as sodium hyaluronate; and monovalent salts of chondroitin sulfuric acid, such as sodium chondroitin sulfate.

The monovalent salt of the water-soluble anionic polymer has a viscosity as a 1 wt % or 10 wt % aqueous solution that is preferably from 0.01 to 2,000 mPa-s, more preferably from 0.1 to 1,000 mPa-s, and most preferably from 1.0 to 500 mPa-s. Taking into account the productivity, it is more preferable for the viscosity of a 10 wt % aqueous solution to satisfy the above range. The viscosity is a value measured at 20° C. with a BL-type Brookfield viscometer.

The solvent used in the solution containing the monovalent salt of the water-soluble anionic polymer and a hydrophobizing agent is preferably water or a mixed solvent of water with a hydrophilic organic solvent. The water may be, for example, tap water, deionized water or distilled water. Examples of the hydrophilic organic solvent include methanol, ethanol, 1-propanol, 2-propanol, ethylene glycol, propylene glycol, butylene glycol, dipropylene glycol, methyl cellosolve, ethyl cellosolve, propyl cellosolve, diethylene glycol monobutyl ether, methyl cellosolve acetate, ethyl cellosolve acetate, methyl carbitol, ethyl carbitol, butyl carbitol, ethyl carbitol acetate, formic acid, acetic acid, propionic acid, acetone, tetrahydrofuran, dimethylformamide, dimethylsulfoxide, trioxane, tetrahydrofuran, N-methyl-2-pyrrolidone, dimethylamine, monoethanolamine, pyridine and acetonitrile. These may be of one type used alone or two or more may be used in admixture. Of these, water or a mixed solvent of water and a lower alcohol of 1 to 3 carbons is preferred.

Optionally, a hydrophobic organic solvent may also be added to the above solvent. Examples of the hydrophobic organic solvent include higher alcohols such as 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethylbutanol, I-heptanol, 2-heptanol, 3-heptanol, 2-octanol, 2-ethyl-1-hexanol, benzyl alcohol and cyclohexanol; ether alcohols such as butyl cellosolve: ketones such as methyl ethyl ketone, methyl isobutyl ketone and cyclohexanone; esters such as ethyl acetate, butyl acetate, ethyl propionate and cellosolve acetate; aliphatic or aromatic hydrocarbons such as pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexyl, benzene, toluene, xylene and ethylbenzene; halogenated hydrocarbons such as carbon tetrachloride, trichloroethylene, chlorobenzene and tetrabromoethane; ethers such as diethyl ether and dimethyl ether; acetals such as methylal and diethyl acetal; the following cyclic, linear or branched silicone oils and copolymers thereof: dimethylpolysiloxanes such as hexamethylcyclotrisiloxane (D3), octamethylcyclotetrasiloxane (D4), decamethylcyclopentasiloxane (D5), dodecamethylcyclohexasiloxane (D6), tetradecamethylcycloheptasiloxane (D7), hexamethyldisiloxane, octamethyltrisiloxane and decamethyltetrasiloxane, and also methyl trimethicone, methyl phenyl polysiloxane, diphenyl polysiloxane, diphenyl siloxyphenyl trimethicone, trimethyl siloxyphenyl dimethicone, caprylyl methicone and cetyl dimethicone; and sulfur or nitrogen-containing organic compounds such as nitropropene and nitrobenzene.

In this invention, “hydrophilic organic solvent” refers to an organic solvent for which an equal volume mixture with water maintains a uniform appearance, and “hydrophobic organic solvent” refers to a solvent for which, after being gently mixed with the same volume of pure water at one atmosphere ($1.013\times10^5$ Pa) and a temperature of 20° C. and allowed to quiet down, the mixed liquid is unable to maintain a uniform appearance.

The earlier mentioned hydrophobizing agents may be used as the hydrophobizing agent in Method 2, although it is essential to suitably select one which dissolves in the above solvent. For example, when water is used as the solvent, it is preferable to use a carboxyl group, hydroxyl group, sulfonic group, sulfate group or phosphate ester group-containing monovalent salt compound that dissolves in water. The use of a carboxylate salt or an amino acid derivative salt is more preferred. Even one that dissolves in the solvent under heating may be used as the hydrophobizing agent.

The mixing ratio of the monovalent salt of the water-soluble anionic polymer and the hydrophobizing agent in the solution, expressed as “monovalent salt of water-soluble anionic polymer:hydrophobizing agent,” is preferably from 99.9:0.1 to 70:30, more preferably from 99.5:0.5 to 80:20, even more preferably from 99:1 to 85:15, and still more preferably from 98:2 to 90:10. At a mixing ratio in this range, sufficient hydrophobicity can be obtained and there is no risk of a drop in the degree of crosslinking.

The solids (monovalent salt of water-soluble anionic polymer and hydrophobizing agent) concentration in the solution is preferably from 1 to 80 wt %, and more preferably from 5 to 50 wt %.

Spray drying may be carried out by a known method. For example, spray drying may be carried out by atomizing the solution in heated air using, for example, an ordinary rotary disk, two-fluid nozzle, jet flow or other type of spray dryer.

Spray drying may be carried out at a disk rotational speed of from about 1,000 to about 40,000 rpm. The temperature of the hot air is the temperature required for moisture to evaporate, this being preferably between 60° C. and 250° C. Also, the solution may be sprayed into hot air while being heated.

Next, the particles obtained by spray drying (also referred to below as the “pre-crosslinking particles”) are crosslinked using a polyvalent metal salt. Crosslinking treatment can be carried out by, for example, dispersing the pre-crosslinking particles in a medium, adding a polyvalent metal salt-containing solution to the dispersion, and stirring. Or the dispersion may be added to a polyvalent metal salt-containing solution, and stirring then carried out.

The pre-crosslinking particles are dispersed in a medium to a concentration of preferably from 1 to 80 wt %, and more preferably from 30 to 60 wt %. The medium that disperses the particles is preferably a lower alcohol such as methanol, ethanol, 1-propanol or 2-propanol; an ether alcohol such as methyl cellosolve, ethyl cellosolve, isopropyl cellosolve, butyl cellosolve or diethylene glycol monobutyl ether; or a hydrophilic organic solvent such as acetone, tetrahydrofuran, dimethylformamide, N-methyl-2-pyrrolidone or acetonitrile. A single solvent such as a lower alcohol or a lower alcohol-containing mixed solvent is especially preferred.

Examples of the polyvalent metal salt include calcium salts, strontium salts, magnesium salts, barium salts, radium salts, lead salts, zinc salts, nickel salts, iron salts, copper salts, cadmium salts, cobalt salts and manganese salts. Because they are metals contained in seawater and from the standpoint of environmental considerations, safety and versatility as well, calcium salts and magnesium salts are preferred. Specific examples of such polyvalent metal salts include calcium chloride, calcium sulfate, calcium carbonate, calcium hydroxide, calcium oxide, magnesium chloride, magnesium sulfate, magnesium carbonate, magnesium hydroxide and magnesium oxide. Calcium chloride and magnesium chloride are preferred in terms of, for example, solubility in water, handleability and cost.

The concentration of the polyvalent metal salt in the polyvalent metal salt-containing solution is preferably from 1 to 40 wt %, and more preferably from 10 to 30 wt % u. The solvent in the solution is preferably water; a lower alcohol solvent such as methanol, ethanol, 1-propanol or 2-propanol; or a mixed solvent of these. So long as the salt can be dissolved to the target concentration without dissolving the particles, mixed solvents with other organic solvents are also acceptable.

Crosslinking treatment may be carried out while optionally heating. Heating may be carried out when adding the polyvalent metal salt-containing solution to the dispersion, may be carried out during stirring following addition, or may be carried out at both of these times. The temperature at this time is preferably between 10° C. and 100° C., and more preferably between 40° C. and 80° C. The treatment time is preferably from 0.5 to 24 hours, and more preferably from 1 to 12 hours. By heating, the solubility of the hydrophobizing agent can be increased; in addition, the viscosity of the medium decreases, allowing the hydrophobizing agent to more readily penetrate to the interior of the particles.

Because the monovalent salt of the water-soluble anionic polymer and the hydrophobizing agent are included in the pre-crosslinking particles, by carrying out crosslinking treatment, hydrophobization is also carried out at the same time.

Following crosslinking treatment, washing and drying of the particles may be optionally carried out to obtain the hydrophobized polymer particles. Washing may be carried out by an ordinary method such as that of, for example, removing the solvent following hydrophobization, adding water and centrifugal separation. Drying may be carried out by an ordinary method such as spray drying, vacuum drying or freeze drying.

Method 3 includes the step of forming a W/O emulsion which contains a monovalent salt of a water-soluble anionic polymer and a hydrophobizing agent in water droplets, and the step of carrying out crosslinking treatment using a polyvalent metal salt and at the same time carrying out hydrophobization. The monovalent salt of a water-soluble anionic polymer is exemplified by the same compounds as mentioned above in the explanation of Method 2. Also, it is essential for the hydrophobizing agent to be one which is present in the aqueous phase when the W/O emulsion is formed. Use of the above-mentioned carboxyl group, hydroxyl group, sulfonic acid group, sulfate group or phosphate ester group-containing monovalent salt compounds is preferred. Use of a carboxylate salt or an amino acid derivative salt is more preferred.

An example of a method of forming the W/O emulsion is described. First, Solution C composed of a monovalent salt of a water-soluble anionic polymer and a hydrophobizing agent dissolved in water or a mixed solvent of water and a hydrophilic organic solvent is prepared. If necessary, heating may be carried out at this time in order to dissolve the hydrophobizing agent. Next, Solution C and a hydrophobic organic solvent are mixed together and are then emulsified using an agitator, homogenizer or the like. At the time of mixture, Solution C may be added to the hydrophobic organic solvent, or the hydrophobic organic solvent may be added to Solution C.

At this time, a Solution D of a surfactant or a polymer stabilizer dissolved in the hydrophobic organic solvent may be used instead of the hydrophobic organic solvent in order to control the particle size of the water droplets in the W/O emulsion. In this case, Solution C and Solution D are mixed together, and are then emulsified using an agitator, homogenizer or the like. At the time of mixture, Solution C may be added to Solution D, or Solution D may be added to Solution C.

Another example of a method of forming the W/O emulsion is to charge a container all at once with the monovalent salt of the water-soluble anionic polymer, hydrophobizing agent, water, surfactant, hydrophobic organic solvent and other necessary ingredients, and then carry out emulsification using an agitator, homogenizer or the like.

The mixing ratio of the monovalent salt of the water-soluble anionic polymer and the hydrophobizing agent, expressed as "monovalent salt of water-soluble anionic polymer:hydrophobizing agent," is preferably from 99.9:0.1 to 70:30, more preferably from 99.5:0.5 to 80:20, even more preferably from 99:1 to 85:15, and still more preferably from 98:2 to 90:10. At a mixing ratio in this range, sufficient hydrophobicity can be obtained and there is no danger of a drop in the degree of crosslinking.

Heating may be carried out when forming the W/O emulsion. By heating, the solubility of the hydrophobizing agent can be increased, enabling it to be homogenized with the monovalent salt of the water-soluble anionic polymer, and thus making it possible to stabilize the W/O emulsion. The heating temperature is preferably between 15° C. and 100° C., and more preferably between 40° C. and 80° C.

After the W/O emulsion has been formed, crosslinking treatment is carried out. Crosslinking treatment may be carried out by adding the polyvalent metal salt-containing solution to the W/O emulsion and stirring. Alternatively, crosslinking treatment may be carried out by adding the W/O emulsion to a polyvalent metal salt-containing solution and stirring. The polyvalent metal salt-containing solution used may be the same as that described above in the explanation of Method 2.

If necessary, crosslinking treatment may be carried out under heating. Heating may be carried out when adding the polyvalent metal salt-containing solution to the dispersion, may be carried out during stirring following addition, or may be carried out at both of these times. The heating temperature is preferably between 10° C. and 100° C., and more preferably between 40° C. and 80° C. The treatment time is preferably from 0.5 to 24 hours, and more preferably from 1 to 12 hours. By heating, the solubility of the hydrophobizing agent can be increased, in addition to which the viscosity of the medium decreases, enabling the hydrophobizing agent to more readily penetrate to the interior of the particles.

Because the monovalent salt of the water-soluble anionic polymer and the hydrophobizing agent are included in the aqueous phase of the above W/O emulsion, by carrying out crosslinking treatment, hydrophobization also is carried out at the same time.

After crosslinking treatment, if necessary, washing and drying of the particles may be carried out to obtain the hydrophobized polymer particles. Washing may be carried out by an ordinary method such as that of, for example, removing the solvent following crosslinking treatment, adding water and centrifugal separation. Drying may be carried out by an ordinary method such as spray drying, vacuum drying or freeze drying.

With Method 2 or Method 3, the hydrophobizing agent is deposited not only at the surface but can be made to penetrate to the interior as well, enabling particles of even greater hydrophobicity to be obtained.

Method 4 is a method which includes the step of adding dropwise a polyvalent metal salt solution to a medium in which a monovalent salt of a water-soluble anionic polymer and a hydrophobizing agent dissolve, and carrying out crosslinking treatment while at the same time carrying out hydrophobization; or a method which includes the step of adding dropwise a liquid in which a monovalent salt of a water-soluble anionic polymer and a hydrophobizing agent are dissolved to a medium in which a polyvalent metal salt dissolves, and carrying out crosslinking treatment while at the same time carrying out hydrophobization.

The hydrophobizing agent is preferably the above-described monovalent salt compound containing a carboxyl group, hydroxyl group, sulfonic group, sulfate group or phosphate ester group. The use of a carboxylate salt or an amino acid derivative salt is more preferred.

An example of Method 4 is described. First, Solution E is prepared by dissolving a monovalent salt of a water-soluble anionic polymer and a hydrophobizing agent in water or a mixed solvent of water and a hydrophilic organic solvent. If necessary, heating may be carried out at this time to dissolve the hydrophobizing agent.

Next, Solution F containing a polyvalent metal salt is added and stirring is carried out. Alternatively, Solution E is added to Solution F containing a polyvalent metal salt and stirring is carried out. The polyvalent metal salt-containing solution used may be the same as that mentioned in the description of Method 2.

In so doing, crosslinking treatment and hydrophobization can be carried out at the same time, and the target hydrophobized polymer which has gradually become insoluble deposits or precipitates out. The treatment time is preferably from 0.5 to 24 hours, and more preferably from 1 to 12 hours.

At this time, in order to control the particle size of the deposited or precipitated matter, a surfactant or polymer stabilizer may be dissolved in at least one of Solution E or Solution F. In this case, Solution E and Solution F are mixed together and emulsified using an agitator or homogenizer. When mixing. Solution E may be added to Solution F, or Solution F may be added to Solution E.

Heating may be carried out when effecting deposition or precipitation of the target hydrophobized polymer. Heating may be caried out when Solution E and Solution F are mixed together, may be carried out when stirring following mixture, or may be carried out at both times. By heating, the solubility of the hydrophobizing agent can be increased, enabling it to homogenize with the monovalent salt of the water-soluble anionic polymer, and enabling the bonds to be stabilized. The heating temperature is preferably between 15° C. and 100° C., and more preferably between 40° C. and 80° C.

The mixing ratio between the monovalent salt of the water-soluble anionic polymer and the hydrophobizing agent, expressed as "monovalent salt of water-soluble anionic polymer:hydrophobizing agent." is preferably from 99.9:0.1 to 70:30, more preferably from 99.5:0.5 to 80:20, even more preferably from 99:1 to 85:15, and still more preferably from 98:2 to 90:10. At a mixing ratio in this range, sufficient hydrophobicity can be obtained and there is no danger of a decrease in the degree of crosslinking.

After treatment, if necessary, washing and drying of the particles may be carried out to obtain the hydrophobized polymer particles. Washing may be carried out by an ordinary method such as that of, for example, removing the solvent following crosslinking treatment, adding water and centrifugal separation. Drying may be carried out by an ordinary method such as spray drying, vacuum drying or freeze drying.

If necessary, the size of the resulting hydrophobized polymer particles may be adjusted by carrying out surface treatment or by carrying out pulverization using a known apparatus.

[Hydrophobized Compounds]

In a second embodiment, the marine biodegradation accelerator of the invention is a hydrophobized compound obtained by reacting a salt compound containing an anion having six or more carbon atoms and three or more oxygen atoms and a monovalent cation with a polyvalent metal salt containing a metal cation having a valence of two or more, and thereby bonding the anion with the metal cation having a valence of two or more.

The anion having six or more carbon atoms and three or more oxygen atoms is exemplified by monovalent anions having six or more carbon atoms and three or more oxygen atoms (also referred to below simply as "monovalent anions"), and anions having six or more carbon atoms, three or more oxygen atoms and two monovalent anionic substituents (also referred to below simply as "divalent anions"). To obtain a long-chain linear polymer, it is preferable for the monovalent anionic substituents to be located further apart on the divalent anion, and more preferable for the monovalent anionic substituents to be positioned at both ends.

Examples of the monovalent anionic functional groups on the anion include the carboxylic acid anion (—$COO^-$), sulfonic acid anion (—$SO_3^-$), sulfuric acid anion (—O—$SO_3^-$) and phosphoric acid anion (—P(═O)(OH)—$O^-$). Of these, —$COO^-$, —$SO_3^-$ and —O—$SO_3^-$ are preferred, —$COO^-$ and —$SO_3^-$ are more preferred, and —$COO^-$ is still more preferred.

The monovalent anion and divalent anion have a number of carbons that is preferably from 6 to 500, more preferably from 10 to 300, and even more preferably from 12 to 150.

Specific examples of the monovalent cation include monovalent metal ions such as the lithium, sodium, potassium and silver ions; and monovalent organic ions such as the ammonium cation. Of these, metal ions are preferred, with sodium and potassium ions being more preferred.

Hydrophobized compounds obtained by bonding the above monovalent anion with a metal cation having a valence of two or more are referred to below as "Hydrophobized Compound A," and hydrophobized compounds obtained by bonding the above divalent anion with a metal cation having a valence of two or more are referred below as "Hydrophobized Compound B."

[Hydrophobized Compound A]

Hydrophobized Compound A can be obtained by bonding the monovalent anion with a metal cation having a valence of two or more. The salt compound composed of a monovalent anion and a monovalent cation that serves as a starting material for Hydrophobized Compound A (which salt compound is also referred to below as "Salt Compound A") is exemplified by salt compounds with a structure in which the above monovalent anionic substituent has been introduced through a linking group into a compound having an active functional group (also referred to below as "Monovalent Anionic Substituent-Inserted Salt Compound A"). In this invention, "active functional group" refers to a functional group that can give rise to a condensation reaction, such as a hydroxyl group, amino group or carboxyl group.

The active functional group-containing compound that serves as a starting material for Salt Compound A is preferably a hydroxyl group-containing compound, such as a monohydric alcohol, monoamino compound, (poly)alkylene glycol ether or (poly)alkylene glycol ester. The monovalent anionic substituent that is introduced onto the compound having an active functional group is preferably —$COO^-$ because insertion is easy.

The monohydric alcohol is an alcohol having a single hydroxyl group. It has preferably from 6 to 30 carbon atoms, more preferably from 10 to 25 carbon atoms, and even more preferably from 12 to 20 carbon atoms. The monohydric alcohol may be linear, branched or cyclic, although one that is linear is preferred. Specific examples of the monohydric alcohol include hexanol, heptanol, octanol, nonanol, decanol, undecanol, dodecanol, tridecanol, tetradecanol, pentadecanol, hexadecanol, heptadecanol, octadecanol, nonadecanol, icosanol, henicosanol, docosanol, tricosanol, tetracosanol, pentacosanol, hexacosanol, heptacosanol, octacosanol, nonacosanol and triacontanol.

The monoamino compound is a compound having a single amino group. It as preferably from 6 to 30 carbon atoms, more preferably from 10 to 25 carbon atoms, and even more preferably from 12 to 20 carbon atoms. The monoamino compound may be linear, branched or cyclic, although one that is linear is preferred. Specific examples include aminohexane, aminoheptane, aminooctane, aminononane, aminodecane, aminoundecane, aminododecane, aminotridecane, aminotetradecane, aminopentadecane, aminohexadecane, aminoheptadecane, aminooctadecane, aminononadecane and aminoicosane.

The (poly)alkylene glycol ether is preferably one having an HLB of not more than 16, more preferably one having an HLB of not more than 12, and even more preferably one having an HLB of not more than 8. Specific examples include (poly)alkylene glycol monoalkyl ethers such as (poly)ethylene glycol monododecyl ether, (poly)ethylene glycol monomyristyl ether, (poly)ethylene glycol monocetyl ether, (poly)ethylene glycol monostearyl ether, (poly)ethylene glycol monooleyl ether, (poly)ethylene glycol monobehenyl ether, (poly)propylene glycol monododecyl ether, (poly)propylene glycol monomyristyl ether, (poly)propylene glycol monocetyl ether, (poly)propylene glycol monostearyl ether, (poly)propylene glycol monooleyl ether and (poly) propylene glycol monobehenyl ether; and (poly)alkylene glycol monoaryl ethers such as (poly)ethylene glycol monophenyl ether and (poly)propylene glycol monophenyl ether.

The (poly)alkylene glycol ester is preferably one having an HLB of not more than 16, more preferably one having an HLB of not more than 12, and even more preferably one having an HLB of not more than 8. Specific examples include polyalkylene glycol monofatty acid esters such as (poly)ethylene glycol monolaurate, (poly)ethylene glycol monomyristate, (poly)ethylene glycol monopalmitate, (poly)ethylene glycol monostearate, (poly)ethylene glycol monooleate, (poly)ethylene glycol monoisostearate, (poly) ethylene glycol monoarachidate, (poly)ethylene glycol monobehenate, (poly)propylene glycol monolaurate, (poly) propylene glycol monomyristate, (poly)propylene glycol monopalmitate, (poly)propylene glycol monostearate, (poly)propylene glycol monooleate, (poly)propylene glycol monoisostearate, (poly)propylene glycol monoarachidate and (poly)propylene glycol monobehenate; and polyalkylene sorbitan monofatty acid esters such as (poly)ethylene sorbitan monolaurate, (poly)ethylene sorbitan monomyristate, (poly)ethylene sorbitan monopalmitate, (poly) ethylene sorbitan monostearate, (poly)ethylene sorbitan monooleate, (poly)ethylene sorbitan monoisostearate, (poly) ethylene sorbitan monoarachidate, (poly)ethylene sorbitan monobehenate, (poly)propylene sorbitan monolaurate, (poly)propylene sorbitan monomyristate, (poly)propylene sorbitan monopalmitate, (poly)propylene sorbitan monostearate, (poly)propylene sorbitan monooleate, (poly)propylene sorbitan monoisostearate. (poly)propylene sorbitan monoarachidate and (poly)propylene sorbitan monobehenate.

The number-average molecular weight (Mn) of the polyalkylene glycol ether and the (poly)alkylene glycol ester has a lower limit of, in order of increasing preference, 100 or more, 300 or more, 400 or more, or 500 or more. The upper limit is, in order of increasing preference, not more than 10,000, not more than 6,000, not more than 4,000, not more than 3,000 or not more than 2,000.

The method for introducing a monovalent anionic substituent onto the compound having an active functional group is exemplified by, in cases where $—COO^-$ is to be inserted, a method in which the compound having an active functional group and a divalent carboxylic acid anhydride are subjected to an esterification reaction in the presence of a monovalent metal salt, and a method in which these are reacted with a monovalent metal to form a metal alkoxide, following which esterification is carried out using a dicarboxylic anhydride. The dicarboxylic anhydride is preferably succinic anhydride, maleic anhydride or phthalic anhydride; taking biodegradability into account, succinic anhydride and maleic anhydride are more preferred. In cases where $—SO_3^-$ is to be inserted, an exemplary method is that of reacting a compound containing a hydroxyl group or amino group as the active functional group with $SO_3$ or with a $SO_3$·Lewis base complex within an aprotic polar solvent. A tertiary amine, pyridine, DMF or the like may be used as the Lewis base. The aprotic polar solvent is preferably acetonitrile. These reactions may be carried out by known methods.

Other examples of Salt Compound A include amino acid derivative salts, sulfate ester salts, sulfonic acid salts, phosphate ester salts and lactic acid ester salts.

The amino acid derivative salt is preferably one having from 6 to 30 carbon atoms, more preferably one having from 10 to 25 carbon atoms, and even more preferably one having from 12 to 20 carbon atoms. The amino acid derivative salt is preferably a monovalent salt, and more preferably a monovalent metal salt.

Examples of the amino acid derivative salts include sarcosine derivative salts such as potassium capryloyl sarcosinate, sodium capryloyl sarcosinate, potassium lauroyl sarcosinate, sodium lauroyl sarcosinate, potassium myristoyl sarcosinate, sodium myristoyl sarcosinate, potassium palmitoyl sarcosinate, sodium palmitoyl sarcosinate, potassium cocoyl sarcosinate and sodium cocoyl sarcosinate; glutamic acid derivative salts such as potassium lauroyl glutamate, sodium lauroyl glutamate, potassium myristoyl glutamate, sodium myristoyl glutamate, sodium palmitoyl glutamate, magnesium palmitoyl glutamate, potassium stearoyl glutamate, sodium stearoyl glutamate, potassium cocoyl acyl glutamate, sodium cocoyl acyl glutamate, potassium cocoyl glutamate, sodium cocoyl glutamate, potassium acyl glutamate, sodium acyl glutamate, sodium dilauroyl glutamate lysine and sodium polyglutamate; glycine derivative salts such as potassium lauroyl glycine, sodium lauroyl glycine, potassium myristoyl glycine, sodium myristoyl glycine, sodium palmitoyl glycine, sodium palmitoyl methyl glycine, potassium cocoyl acyl glycine, sodium cocoyl acyl glycine, potassium cocoyl glycine and sodium cocoyl glycine; alanine derivative salts such as potassium lauroyl methyl alanine, sodium lauryl methyl alanine, sodium myristoyl methyl alanine, sodium cocoyl alanine and sodium cocoyl methyl alanine; aspartic acid derivative salts such as potassium lauroyl aspartate, sodium lauroyl aspartate, potassium myristoyl aspartate, sodium myristoyl aspartate, potassium palmitoyl aspartate, sodium palmitoyl aspartate, potassium stearoyl aspartate and sodium stearoyl aspartate; taurine derivative salts such as sodium lauroyl taurate, potassium lauroyl taurate, sodium lauroyl methyl taurate, potassium myristoyl taurate, sodium myristoyl taurate, sodium myristoyl methyl taurate, potassium palmitoyl taurate, sodium palmitoyl taurate, potassium palmitoyl methyl taurate, sodium palmitoyl methyl taurate, potassium stearoyl taurate, sodium stearoyl taurate and sodium stearoyl methyl taurate; and amino acid derivative salts having hydrocarbon groups, including proline derivative salts such as sodium lauroyl proline, sodium myristoyl proline and sodium palmitoyl proline. N-acyl derivative salts of amino acids are especially preferred.

Examples of the sulfate ester salts include alkyl sulfate ester salts, polyoxyethylene aryl ether sulfate ester salts, polyoxyethylene alkyl ether sulfate ester salts, polyoxyalkylene alkyl ether sulfate ester salts, polyoxyalkylene alkenyl ether sulfuric acid salts and polyoxyethylene castor oil ether sulfate ester salts. The sulfate ester salt is preferably a monovalent salt, and more preferably an ammonium salt or a monovalent metal salt.

The alkyl sulfate ester salts are preferably ones having an alkyl group of from 6 to carbon atoms, more preferably ones having an alkyl group of 10 to 25 carbon atoms, and even more preferably ones having an alkyl group of from 12 to 20 carbon atoms. Specific examples include potassium lauryl sulfate, sodium lauryl sulfate, ammonium lauryl sulfate, potassium myristyl sulfate, sodium myristyl sulfate, ammonium myristyl sulfate, sodium cetyl sulfate, ammonium cetyl sulfate, sodium stearyl sulfate, ammonium stearyl sulfate, sodium oleyl sulfate and ammonium oleyl sulfate.

The polyoxyethylene aryl ether sulfate ester salts are preferably ones having an HLB of not more than 16, and more preferably ones having an HLB value of not more than 12. Specific examples include polyoxyethylene polycyclic phenyl ether sulfate ester salts such as sodium polyoxyethylene polycyclic phenyl ether sulfate and ammonium polyoxyethylene polycyclic phenyl ether sulfate; and sodium polyoxyethylene aryl ether sulfates.

The polyoxyethylene alkyl ether sulfate ester salts are preferably ones having an HLB of 16 or less, and more preferably ones having an HLB of 12 or less. Specific examples include polyoxyethylene alkyl ether sulfate esters, sodium polyoxyethylene lauryl ether sulfate, ammonium polyoxyethylene lauryl ether sulfate, sodium polyoxyethylene myristyl ether sulfate, ammonium polyoxyethylene myristyl ether sulfate, sodium polyoxyethylene cetyl ether sulfate, ammonium polyoxyethylene cetyl ether sulfate, sodium polyoxyethylene stearyl ether sulfate, ammonium polyoxyethylene stearyl ether sulfate, sodium polyoxyethylene oleyl ether sulfate and ammonium polyoxyethylene oleyl ether sulfate.

The polyoxyalkylene alkyl ether sulfate ester salts are preferably ones having an HLB of 16 or less, and more preferably ones having an HLB of 12 or less. Specific examples include sulfate ester sodium salts of polyoxyethylene-polyoxypropylene block copolymers, sulfate ester sodium salts of polyoxyethylene-polyoxybutylene block copolymers and sulfate ester sodium salts of alkyl ethers of polyoxyethylene-polyoxypropylene block copolymers. The polyoxyalkylene alkenyl ether sulfuric acid salts are preferably ones having an HLB of 16 or less, and more preferably one having an HLB of 12 or less. Specific examples include sulfate ester ammonium salts of alkenyl ethers of polyoxyethylene-polyoxyalkylene block copolymers. The polyoxyethylene castor oil ether sulfate esters and salts thereof are preferably ones having an HLB of 16 or less, and more preferably ones having an HLB of 12 or less. Specific examples include polyoxyethylene castor oil ether sulfate ester and ammonium polyoxyethylene castor oil ether sulfate ester.

The sulfonic acid salts are preferably ones having from 6 to 30 carbon atoms, more preferably ones having from 10 to 25 carbon atoms, and even more preferably ones having from 12 to 20 carbon atoms. The sulfonic acid salts are also preferably monovalent salts, and more preferably ammonium salts or monovalent metal salts. Specific examples include alkyl sulfonic acid salts such as sodium lauryl sulfonate, ammonium lauryl sulfonate, sodium myristyl sulfonate, ammonium myristyl sulfonate, sodium cetyl sulfonate, ammonium cetyl sulfonate, sodium stearyl sulfonate, ammonium stearyl sulfonate, sodium oleyl sulfonate and ammonium oleyl sulfonate; dodecylbenzene sulfonic acid salts such as ammonium dodecylbenzene sulfonate and sodium dodecylbenzene sulfonate; alkylene disulfonic acid salts such as sodium alkylene disulfonates; dialkyl succinate sulfonic acid salts such as sodium dialkyl succinate sulfonate; monoalkyl succinate sulfonic acid salts such as disodium monoalkyl succinate sulfonates; salts of naphthalene sulfonic acid formalin condensates, such as sodium salts of naphthalene sulfonic acid formalin condensates; olefin sulfonic acid salts such as sodium olefin sulfonate and ammonium olefin sulfonate; isethionic acid salts such as potassium lauroyl isethionate, sodium lauroyl isethionate, sodium myristoyl isethionate, sodium palmitoyl isethionate and sodium stearoyl isethionate; and sulfosuccinic acid salts such as sodium dihexyl sulfosuccinate, sodium dioctyl sulfosuccinate, ammonium dioctyl sulfosuccinate, sodium didecyl sulfosuccinate and sodium diisobutyl sulfosuccinate. Of these, sulfonic acid salts having an alkyl group of from 12 to 20 carbon atoms are especially preferred.

The phosphate ester salts are exemplified by alkyl phosphate ester salts.

The alkyl phosphate ester salts are preferably ones having an alkyl group of from 6 to 30 carbon atoms, more preferably ones having an alkyl group of from 10 to 25 carbon atoms, and even more preferably ones having an alkyl group of from 12 to 20 carbon atoms. Specific examples include octyl phosphoric acid salts such as potassium octyl phosphate; nonyl phosphoric acid salts such as potassium nonyl phosphate; decyl phosphoric acid salts such as potassium decyl phosphate; undecyl phosphoric acid salts such as potassium undecyl phosphate; lauryl phosphoric acid salts such as potassium lauryl phosphate; myristyl phosphoric acid salts such as potassium myristyl phosphate; cetyl phosphoric acid salts such as potassium cetyl phosphate and sodium cetyl phosphate; and stearyl phosphoric acid salts such as potassium stearyl phosphate.

The lactic acid ester salts are preferably ones having from 6 to 30 carbon atoms, more preferably ones having from 10 to 25 carbon atoms, and even more preferably ones having from 12 to 20 carbon atoms. Specific examples include sodium stearoyl lactate, potassium stearoyl lactate, sodium isostearoyl lactate and sodium lauroyl lactate.

Of these, Monovalent Anionic Substituent-Inserted Salt Compound A, amino acid derivative salts, sulfonic acid salts and sulfate salts are preferred.

[Hydrophobized Compound B]

Hydrophobized Compound B is obtained by bonding the above divalent anion with a metal cation having a valence of two or more, and has a structure in which the divalent anions are intermolecularly bonded through the metal cations having a valence of two or more.

Examples of the salt compound composed of a divalent anion and a monovalent cation that is a starting material of Hydrophobized Compound B (also referred to below as "Salt Compound B") include salt compounds with a structure in which two of the above monovalent anionic substituents have been introduced through linking groups into a compound having two active functional groups (Monovalent Anionic Substituent-Inserted Salt Compound B).

Compounds having two hydroxyl groups, such as dihydric alcohols and (poly)alkylene glycols, and compounds having two amino groups, such as diamino compounds and (poly)alkylene glycol bisaminoalkyl ethers, are preferred as the compound having two active functional groups that serves as the starting material for Salt Compound B.

The dihydric alcohols are alcohols having two hydroxyl groups; ones having from 6 to 30 carbon atoms are preferred, ones having from 10 to 25 carbon atoms are more preferred, ones having from 12 to 20 carbon atoms are even more preferred. The dihydric alcohol may be linear, branched or cyclic, although the further apart the hydroxyl groups, the better; one that is linear is more preferred. Specific examples of the dihydric alcohols include hexanediol, heptanediol, octanediol, nonanediol, decanediol, undecanediol, dodecanediol, tridecanediol, tetradecanediol, pentadecanediol, hexadecanediol, heptadecanediol, octadecanediol, nonadecanediol, icosanediol, henicosanediol, docosanediol, tricosanediol, tetracosanediol, pentacosanediol, hexacosanediol, heptacosanediol, octacosanediol, nonacosanediol and triaconetanediol.

The (poly)alkylene glycols are preferably ones having an HLB of not more than 16, more preferably ones having an HLB of not more than 12, and even more preferably ones having an HLB of not more than 8. Specific examples include polyalkylene glycols such as (poly)ethylene glycol, (poly)propylene glycol, (poly)butylene glycol, (poly)tetramethylene ether glycol, (poly)hexamethylene ether glycol and (poly)octamethylene ether glycol; and copolymers of these. These polyalkylene glycols have a number-average molecular weight (Mn) with a lower limit of, in order of increasing preference, 100 or more, 300 or more, 400 or more and 500 or more; and with an upper limit of, in order of increasing preference, not more than 10,000, not more than 6,000, not more than 4.000, not more than 3,000, and not more than 2,000.

The diamino compounds are compounds having two amino groups, preferably ones having from 6 to 30 carbon atoms, more preferably ones having from 10 to 25 carbon atoms, and even more preferably ones having from 12 to 20 carbon atoms. The diamino compounds may be linear, branched or cyclic, although the further apart the amino groups, the better; one that is linear is more preferred. Specific examples of the diamino compounds include hexanedianine, heptanediamine, octanediamme, nonanediamine, decanediamine, undecanediamine, dodecanediamine, tridecanediamine, tetradecanediamine, pentadecanediamme, hexadecanediamine, heptadecanediamine, octadecanediamine, nonadecanediamine, icosanediamine, isophoronediamine, xylylenediamine, 4,4'-diaminodiphenyhnethane, diethylenetriamine, dipropylenetriamine, triethylenetetramine, tetraethylenepentamine, phenylenediamine, toluylenediamine, bis(aminodiphenyl)methane, 2,2-bis(aminodiphenyl)propane, naphthalenediamine, bis (aminomethyl)norbornane and bis(aminodicyclohexyl) methane.

The method for introducing a monovalent anionic substituent onto the dihydric alcohols, the compounds having two amino groups, such as diamino compounds and (poly) alkylene glycol bisaminoalkyl ethers, and the (poly)alkylene glycols is exemplified by methods in which these compounds and a dicarboxylic anhydride are subjected to an esterification reaction in the presence of a monovalent metal salt.

The method for introducing a monovalent anionic substituent onto the compound having two active functional groups is exemplified by, in cases where —$COO^-$ is to be inserted, a method in which these and a dicarboxylic anhydride are subjected to an esterification reaction in the presence of a monovalent metal salt, and a method in which these are reacted with a monovalent metal to form a metal alkoxide and esterification is subsequently carried out using a dicarboxylic anhydride. The dicarboxylic anhydride is preferably succinic anhydride, maleic anhydride or phthalic anhydride. Taking biodegradability into account, succinic anhydride and maleic anhydride are more preferred. The method used in cases where —$SO_3^-$ is to be inserted may involve, for example, reacting a compound having a hydroxyl group or an amino group as the active functional group with $SO_3$ or with a $SO_3$·Lewis base complex in an aprotic polar solvent. A tertiary amine, pyridine, DMF or the like may be used as the Lewis base. The aprotic polar solvent is preferably, for example, acetonitrile. These reactions may be carried out by known methods.

Examples of Salt Compound B include dicarboxylic acid salts and disulfonic acid salts.

The dicarboxylic acid salt is preferably one having from 6 to 30 carbon atoms, more preferably one having from 8 to 25 carbon atoms, and even more preferably one having from 10 to 20 carbon atoms. The dicarboxylic acid salt is preferably one having monovalent metal cations. Specific examples of the dicarboxylic acid salt include hexanedioic acid salts such as disodium hexanedioate and dipotassium hexanedioate; heptanedioic acid salts such as disodium heptanedioate and dipotassium heptanedioate; octanedioic acid salts such as disodium octanedioate and dipotassium octanedioate; nonanedioic acid salts such as disodium nonanedioate and dipotassium nonanedioate; decanedioic acid salts such as disodium decanedioate and dipotassium decanedioate; undecanedioic acid salts such as disodium undecanedioate and dipotassium undecanedioate; dodecanedioic acid salts such as disodium dodecanedioate and dipotassium dodecanedioate; tridecanedioic acid salts such as disodium tridecanedioate and dipotassium tridecanedioate; tetradecanedioic acid salts such as disodium tetradecanedioate and dipotassium tetradecanedioate; tetradecanedioic acid salts such as disodium pentadecanedioate and dipotassium pentadecanedioate; hexadecanedioic acid salts such as disodium hexadecanedioate and dipotassium hexadecanedioate; heptadecanedioic acid salts such as disodium heptadecanedioate and dipotassium heptadecanedioate; octadecanedioic acid salts such as disodium octadecanedioate and dipotassium octadecanedioate; nonadecanedioic acid salts such as disodium nonadecanedioate and dipotassium nonadecanedioate; and eicosanedioic acid salts such as disodium eicosanedioate and dipotassium eicosanedioate; aliphatic dicarboxylic acid salts such as isomers having these branched structures; and aromatic dicarboxylic acid salts, including phthalic acid salts such as disodium phthalate and dipotassium phthalate, isophthalic acid salts such as disodium isophthalate and dipotassium isophthalate, and terephthalic acid salts such as disodium terephthalate and dipotassium terephthalate. Of these, salts of aliphatic dicarboxylic acids having from to 20 carbon atoms, such as decanedioic acid salts, dodecanedioic acid salts, tetra hexadecanedioic acid salts, octadecanedioic acid salts and eicosanedioic acid salts, are preferred.

The disulfonic acid salt is a sulfonic acid having two sulfonic acid groups. Ones having from 6 to 30 carbon atoms are preferred, ones having from 8 to 25 carbon atoms are more preferred, and ones having from 10 to 20 carbon atoms are most preferred. The divalent sulfonic acid salt is preferably one having monovalent metal cations. Specific examples of the disulfonic acid salts include hexanedisulfonates, heptanedisulfonates, octanedisulfonates, nonanedisulfonates, decanedisulfonates, benzenedisulfonates, naphthalenedisulfonates, naphthalenetrisulfonates, naphthalenetetrasulfonates, anthracenedisulfonates, anthraquinonedisulfonates, phenanthrenedisulfonates, fluorenonedisulfonates, carbazoledisulfonates, diphenylmethanedisulfonates, biphenyldisulfonates, terphenyldisulfonates, terphenyltrisulfonates, naphthalenesulfonate-formalin condensates, phenanthrenesulfonate-formalin condensates, anthracenesulfonate-formalin condensates, fluorenesulfonate-formalin condensates and carbazolesulfonate-formalin condensates.

Of these, Monovalent Anionic Substituent-Inserted Salt Compound B and dicarboxylic acid salts are preferred as Salt Compound B.

[Method of Preparing Hydrophobized Compound]

Methods for preparing hydrophobized Compound A or B include Methods (1) and (2) below.

(1) A method which includes the step of forming a water-in-oil (W/O) emulsion containing Salt Compound A or B in water droplets, and the step of carrying out bonding treatment using a polyvalent metal salt (Method 1).

(2) A method which adds dropwise a polyvalent metal salt solution to a medium in which Salt Compound A or B dissolves, and induces deposition or precipitation while carrying out bonding treatment; or a method which adds dropwise a solution of Salt Compound A or B to a medium in which a polyvalent metal salt dissolves, and induces deposition or precipitation while carrying out bonding treatment (Method 2).

Method 1 is a method which includes the step of including Salt Compound A or B in water droplets, and the step of carrying out ionic bonding using a polyvalent metal salt.

An example of the method of forming a W/O emulsion is described. First, a solution is prepared in which one or more Salt Compound A or B is dissolved in water or a mixed solvent of water and a hydrophilic organic solvent. If necessary, heating may be carried out at this time. Next, the solution and a hydrophobic organic solvent are mixed together, and are then emulsified using an agitator, homogenizer or the like. At the time of mixture, the solution may be added to the hydrophobic organic solvent, or the hydrophobic organic solvent may be added to the solution. To control the particle size of the water droplets in the W/O emulsion, a surfactant or a polymer stabilizer may be dissolved in the hydrophobic organic solvent and used at this time.

Another example of the method of forming a W/O emulsion is to charge a container all at once with one or more Salt Compound A or B, a hydrophobizing agent, water, a surfactant, a hydrophobic organic solvent, and other necessary ingredients, and then carry out emulsification using an agitator, homogenizer or the like.

When forming a W/O emulsion, heating may be carried out. By means of heating, the solubility can be increased, making it possible to homogenize Salt Compound A or B and stabilize the W/O emulsion. The heating temperature is preferably between 15° C. and 100° C., and more preferably between 40° C. and 80° C.

After forming the W/O emulsion, ionic bonding is carried out. Bonding treatment may be carried out by adding a polyvalent metal salt-containing solution to the W/O emulsion and stirring. Alternatively, the W/O emulsion may be added to a polyvalent metal salt-containing solution and stirring carried out.

Examples of the polyvalent metal salt include calcium salts, strontium salts, magnesium salts, barium salts, radium salts, lead salts, zinc salts, nickel salts, iron salts, copper salts, cadmium salts, cobalt salts and manganese salts. Taking into account the metals present in seawater and also environmental considerations, safety and versatility, calcium salts and magnesium salts are preferred. Specific examples of the polyvalent metal salts include calcium chloride, calcium sulfate, calcium carbonate, calcium hydroxide, calcium oxide, magnesium chloride, magnesium sulfate, magnesium carbonate, magnesium hydroxide and magnesium oxide. However, in terms of the solubility in water, handleability, cost and other considerations, calcium chloride and magnesium chloride are preferred.

The polyvalent metal salt concentration in the polyvalent metal salt-containing solution is preferably from 1 to 40 wt %, and more preferably from 10 to 30 wt %. The solvent in this solution is preferably water; a lower alcohol solvent such as methanol, ethanol, 1-propanol or 2-propanol; or a mixed solvent thereof. However, mixed solvents with other organic solvents are also acceptable, provided that they can dissolve the salt to the target concentration without dissolving the particles.

If necessary, bonding treatment may be carried out while heating. Heating may be carried out when adding the solution containing the polyvalent metal salt to the dispersion, may be carried out when stirring following such addition, or may be carried out at both times. The heating temperature is preferably between 10° C. and 100° C., and more preferably between 40° C. and 80° C. The treatment time is preferably from 0.5 to 24 hours, and more preferably from 1 to 12 hours. The solubility of the hydrophobizing agent can be increased by heating.

Because the aqueous phase of the W/O emulsion contains one or more monovalent salt of a monovalent anion having six or more carbon atoms and three or more oxygen atoms, by carrying out bonding treatment, hydrophobizing treatment also takes place at the same time.

After bonding treatment, washing and drying of the particles may be optionally carried out to give particles composed of the hydrophobized compound. Washing may be carried out by an ordinary method, such as that of removing the solvent following bonding treatment, adding water and centrifugal separation. Drying may be carried out by an ordinary method such as spray drying, vacuum drying or freeze drying. Moreover, if necessary, the resulting hydrophobized compound particles may be subjected to surface treatment or the particle size may be adjusted by size reduction treatment using a known apparatus.

Method 2 is a method which adds dropwise a polyvalent metal salt solution to a medium in which Salt Compound A or B dissolves, and induces deposition or precipitation while carrying out bonding treatment; or a method which adds dropwise a solution of Salt Compound A or B to a medium in which the polyvalent metal salt dissolves, and induces deposition or precipitation while carrying out bonding treatment.

An example of Method 2 is explained. First, Solution G of one or more Salt Compound A or B dissolved in water or a mixed solvent of water and a hydrophilic organic solvent is prepared. If necessary, heating may be carried out at this time to increase the solubility. Next, Solution H containing a polyvalent metal salt is added and stirred. Alternatively, a solution obtained by dissolving one or more of Salt Compound A or B may be added to a polyvalent metal salt-containing solution and stirred. The polyvalent metal salt-containing solution used may be similar to that mentioned in the description of Method 1.

In this way, bonding treatment can be carried out and the target Hydrophobized Compound A or B that gradually becomes insoluble deposits or precipitates out. The treatment time is preferably from 0.5 to 24 hours, and more preferably from 1 to 12 hours.

At this time, a surfactant or a polymer stabilizer may be dissolved in at least one of Solutions G and H for the purpose of controlling the particle size of the deposited or precipitated matter.

Heating may be carried out when causing the target Hydrophobized Compound A or B to deposit or precipitate out. Such heating may be carried out when mixing together Solution G and Solution H, may be carried out when stirring after such mixture, or may be carried out at both times. By heating, the solubility of Salt Compound A or B can be increased, thus making it possible to create larger molecules or render the molecular weight distribution more uniform, and to stabilize bonding. The heating temperature is preferably between 15° C. and 100° C., and more preferably between 40° C. and 80° C.

Following treatment, if necessary, washing and drying of the particles may be carried out to give the hydrophobized compound particles. Washing may be carried out by an ordinary method, such as that of removing the solvent following crosslinking treatment, adding water and centrifugal separation. Drying may be carried out by an ordinary method such as spray drying, vacuum drying or freeze drying. Moreover, if necessary, the resulting hydrophobized compound particles may be subjected to surface treatment or the particle size may be adjusted by size reduction treatment using a known apparatus.

When preparing Hydrophobized Compound B, in order to adjust the properties, a partially bridged structure or the like can be imparted by using, together with Salt Compound B, a salt having an anion with three or more monovalent anionic substituents and a monovalent cation. Aliphatic polycarboxylic acid salts having a valence of three or more, such as aconitic acid salts, and aromatic polycarboxylic acid salts such as mellitic acid may be used as such a salt.

Hydrophobized Compound B may be capped at both ends so that no monovalent metal cations remain. At this time, the hydrophobizing agent (monovalent metal salt) used in preparing the above-described hydrophobized polymer may be employed as the compound used in end-capping treatment (end-capping agent), although a monovalent metal salt containing a monovalent anion having not more than 5 carbon atoms may be used to the extent that doing so does not detract from the desired properties. The end-capping agent is preferably a monovalent metal salt containing a monovalent anion having six or more carbon atoms, and more preferably a monovalent metal salt containing a monovalent anion having six or more carbon atoms and three or more oxygen atoms. End capping may be carried out by adding the end-capping agent to a solution containing Salt Compound B, followed by bonding treatment with polyvalent metal ions.

[Resin Composition]

Resin compositions whose biodegradation in the ocean is accelerated can be obtained by using the marine degradation accelerator of the invention in combination with a resin, particularly a biodegradable resin. Also, a plurality of resins may be used in combination for the purpose of adjusting the properties and handleability of the resin composition. Here, "biodegradable resin" refers to a resin which decomposes under the action of microorganisms in the natural world, and is ultimately decomposed to inorganic matter such as water and carbon dioxide.

Examples of resins that can be combined with the marine biodegradation accelerator of the invention include polyethylene, polyester, polypropylene, polyethylene terephthalate, polyvinyl chloride, polystyrene, polyurethane, epoxy resins, chlorinated polyethylene resins, chlorinated polypropylene resins, modified nylon resins, phenolic resins, silicone resins, polyvinyl acetate, ethylene-vinyl acetate copolymers, polyvinyl chloride, polyvinylidene chloride, styrene-maleic acid resins, styrene-butadiene resins, butadiene resins, acrylonitrile-butadiene resins, poly(meth)acrylonitrile resins, (meth)acrylamide resins, bio-PET, biopolyamide, biopolycarbonate, biopolyurethane, polyvinyl alcohol, polybutylene adipate/terephthalate, polyethylene terephthalate succinate, biopolybutylene succinate, polylactic acid blends, starch-blended polyester resins, polybutylene terephthalate succinate, polylactic acid and polyhydroxyalkanoic acid. From the standpoint of reducing the burden on the environment, resins having a high biodegradability are especially preferred.

Examples of the biodegradable resins include resins for which the raw materials are petroleum-derived, such as polycaprolactone, poly(caprolactone/butylene succinate), polybutylene succinate, polyethylene terephthalate copolymers, poly(ethylene terephthalate/succinate), poly(butylene adipate/terephthalate), poly(tetramethylene adipate/terephthalate), polyethylene succinate, poly(butylene succinate/carbonate), polyvinyl alcohol, polyglycolic acid and glycolic acid/caprolactone copolymers; resins for which the raw materials are partially biomass-derived, such as (polylactic acid/polybutylene succinate) block copolymers, (polylactic acid/polycaprolactone) copolymers, (polylactic acid/polyether) copolymers, polylactic acid blend PBAT, lactic acid/glycolic acid copolymers, biopolybutylene succinate, poly(butylene succinate/adipate), starch-blended polyester resins and poly(butylene terephthalate succinate); resins for which the raw materials are 100% biomass-derived, such as polyhydroxybutyric acid, polyhydroxyvaleric acid, polyhydroxycaprylic acid and poly(hydroxybutyatehydroxyhexanoate); and resins derived from naturally occurring polymers, such as cellulose, cellulose acetate, cellulose ester resins, starches, esterified starches and chitosan. From the standpoint of reducing the burden on the environment, the resin raw materials that are combined are preferably derived from biomass, and are most preferably raw materials which are 100% biomass-derived.

The resin composition of the invention may include a solvent. The solvent may be one which dissolves the resin serving as the matrix while leaving the marine biodegradation accelerator undissolved as particles, or may be one which dissolves both the resin and the marine biodegradation accelerator. By suitably adjusting these, practical use as, for example, formed bodies obtained by film formation such as by casting, or as coatings, inks, surface treatments and the like is possible. Preferred solvents include water, hexane, heptane, N-methyl pyrrolidone, dimethylformamide, dimethylacetamide, dimethylsulfoxide, dimethyl sulfone, acetone, methyl ethyl ketone, diethyl ketone, acetophenone, dimethyl ether, dipropyl ether, tetrahydrofuran, chloroform, methylene chloride, trichloroethylene, dichloroethylene, dichloroethane, tetrachloroethane, chlorobenzene, methanol, ethanol, n-propanol, isopropanol, butanol, pentanol, methyl glycol, methyl triglycol, hexyl glycol, phenyl glycol, ethylene glycol, propylene glycol, phenol, cresol, polyethylene glycol, benzene, toluene and xylene. These may be used singly, or two or more may be used in admixture.

When a solvent is used, the total concentration of the resin and the marine biodegradation accelerator in the resin composition is preferably from 0.5 to 90 wt %, more preferably from 1 to 80 wt %, even more preferably from 5 to 60 wt %, and most preferably from 10 to 50 wt %. The proportion of marine biodegradation accelerator in the resin, expressed as a weight ratio, is preferably from 99:1 to 10:90, more preferably from 97:3 to 40:60, even more preferably from 95:5 to 50:50, and most preferably from 90:10 to 60:40.

The resin composition of the invention need not include a solvent. In such a case, the resin may be heat-melted and a marine biodegradation accelerator which does not melt may be added thereto and mixed, or the resin and the marine biodegradation accelerator may be heat-melted and mixed together. In cases where the marine biodegradation accelerator is heat-melted and mixed together with the resin, it is preferable for the marine biodegradation accelerator to have a softening point or melting point suitable for the melting temperature of the resin. The softening point or melting point has a lower limit which is, in order of increasing preference, 60° C. or more, 80° C. or more, 100° C. or more, or 120° C. or more; the upper limit is, in order of increasing preference, not more than 300° C., not more than 250° C., not more than 200° C., or not more than 180° C.

The marine biodegradation accelerator has a content in the resin composition of the invention which, in order to be able to obtain a sufficient degradation accelerating effect and given also the desirability of being set in a range that does not affect the properties of the resin composition, has a lower limit per 100 parts by weight of the resin which is, in order of increasing preference, 1 part by weight or more, 2 parts by weight or more, 3 parts by weight or more, or 5 parts by weight or more. The upper limit in the content of the marine biodegradation accelerator is, in order of increasing preference, not more than 100 parts by weight, not more than 80 parts by weight, not more than 50 parts by weight, or not more than 30 parts by weight. Particularly in cases where the marine biodegradation accelerator is present in the form of particles, the lower limit in the content is preferably 1 part by weight or more, and more preferably 3 parts by weight or more; the upper limit in the content is preferably not more than 50 parts by weight, and more preferably not more than parts by weight.

The resin composition of the invention may optionally include additives such as antioxidants, mold parting agents, release agents, surface modifiers, hydrophobizing agents, water repellents, hydrophilizing agents, dyes and pigments, colorants, heat stabilizers, light stabilizers, weatherability improvers, antistatic agents, anti-fogging agents, lubricants, antiblocking agents, hardeners, softeners, compatibilizers, flame retardants, flow enhancers, plasticizers, dispersants, antimicrobial agents, fillers and metal inactivators. The contents of these additives, although not particularly limited insofar as there is no loss in the advantageous effects of the invention, is preferably from about 0.1 part by weight to about 50 parts by weight per 100 parts by weight of the resin.

In cases where the resin composition includes a solvent, the composition may be prepared by adding, for example, the resin, the marine biodegradation accelerator and the optional additives to the solvent at the same time or in any suitable order and mixing. In cases where the resin composition does not include a solvent, the resin may be melted and the marine biodegradation accelerator and the optional additives may be added thereto, either at the same time or in any suitable order, and mixed; or the resin and the marine biodegradation accelerator may be heated, melted together and mixed, and the optional additives then added and mixed therewith.

[Formed Body]

By molding or otherwise forming the resin composition, a formed body composed of the resin in which the marine biodegradation accelerator is dispersed or dissolved can be obtained. In cases where the resin composition includes a solvent, forming may be carried out using the resin composition directly as is. In cases where the resin composition does not include a solvent, the resin or the resin and the marine biodegradation accelerator within the resin composition may be melted by applying heat, and forming subsequently carried out.

The formed body may be in the shape of, for example, a film, fibers, a sheet or plate or an expansion-molded body, or may have some other shape according to the intended use. The forming method is not particularly limited; use can be made of various forming methods known to the art. Specific examples of such methods include blow molding, injection molding, extrusion, compression molding, melt spinning, film casting and calendaring.

[Surface Modifier]

By taking advantage of its ability to dissolve in salt water, the marine biodegradation accelerator of the invention can be used as a hole-forming agent or a surface modifier for producing porous bodies. For example, when a formed body obtained from a resin composition containing the marine biodegradation accelerator is immersed in an aqueous solution of a monovalent metal salt such as sodium chloride or potassium chloride, surface modification of only the surface layer is possible; when impregnation is continued further, the marine biodegradation accelerator dissolves, enabling a porous body to be produced. By applying these characteristics, use can be expanded to, for example, surfactants, coatings and inks.

EXAMPLES

Synthesis Examples, Practical Examples of the invention and Comparative Examples are given below by way of illustration, although the invention is not limited to these Examples. The particle size distributions and volume mean particle sizes (MV) in the Examples and Comparative Examples were measured using the MICROTRACK MT3000 (Nikkiso Co., Ltd.).

[1] Compound Synthesis

[Synthesis Example 1] Synthesis of Ethylene Glycol Monododecyl Ether Derivative A Ethylene glycol monododecyl ether (103.0 g) was dissolved in 417.4 g of acetonitrile, 118.7 g of sodium carbonate and 109.8 g of maleic anhydride were added thereto, and the system was stirred at room temperature. This was followed by two hours of stirring at 70° C. After the completion of stirring, the system was cooled to room temperature, impurities were removed using a membrane filter, and the filtrate was concentrated. Next, 1,043.6 g of tetrahydrofuran was added to and dissolved in the concentrated filtrate, following which impurities were removed by again carrying out filtration using a membrane filter. The resulting filtrate was concentrated and the solvent was evaporated off under reduced pressure, thereby producing Ethylene Glycol Monododecyl Ether Derivative A in which one end group was substituted with —COONa.

[Synthesis Example 2] Synthesis of Polypropylene Glycol Derivative B

Poly(propylene glycol) bis(2-aminopropyl ether)(Mn, 2,000; 129.7 g) was dissolved in 240.0 g of acetonitrile, following which 15.2 g of sodium carbonate and 14.4 g of succinic anhydride were added thereto and the system was stirred at room temperature for 30 minutes. This was followed by two hours of stirring at 85° C. The system was then cooled to room temperature, 240.0 g of distilled water was added and, using pH test paper, the system was confirmed to exhibit alkalinity. The resulting solution was concentrated using an evaporator and 1,200.0 g of tetrahydrofuran was added and dissolved therein, following which impurities were removed by carrying out filtration using a membrane filter. The resulting filtrate was concentrated and the solvent was removed under reduced pressure, thereby producing Polypropylene Glycol Derivative B in which both end groups were substituted with —COONa.

[Synthesis Example 3] Synthesis of Polypropylene Glycol Derivative C

Tetrahydrofuran (152.8 g) was added to 5.9 g of a 60 wt % sodium hydride dispersion (dispersing medium:liquid paraffin) and, while stirring this on a water bath, a solution of 150.0 g of polypropylene glycol (Mn, 2000) dissolved in 152.8 g of tetrahydrofuran was added dropwise. Following addition of the entire amount, a solution of 14.3 g of maleic anhydride dissolved in 76.4 g of tetrahydrofuran was added dropwise and the system was stirred overnight at room temperature. The system was stirred at 50° C. for 4 hours and then cooled to room temperature, following which decantation washing was carried out twice using tetrahydrofuran, and the precipitate was discarded. Next, the supernatant obtained after removing the precipitate was concentrated using an evaporator and the concentrated supernatant was dissolved in 230.0 g of tetrahydrofuran, following which 770.0 g of hexane was added, impurities were removed by carrying out filtration using a membrane filter, and the filtrate was concentrated. Next, 252.2 g of toluene was added to the concentrated filtrate and dissolved, following which 535.0 g of hexane was added, and impurities were removed by again carrying out filtration using a membrane filter. The resulting filtrate was concentrated and the solvent was removed under reduced pressure, thereby producing Polypropylene Glycol Derivative C in which both end groups were substituted with —COONa.

[Synthesis Example 4] Synthesis of Polypropylene Glycol Derivative D

Aside from changing the polypropylene glycol (Mn, 2.000) to polypropylene glycol (Mn, 1,000), Polypropylene Glycol Derivative D in which both end groups were substituted with —COONa was synthesized in the same way as in Synthesis Example 3

[Synthesis Example 5] Synthesis of Polybutylene Glycol Derivative E

Aside from changing the polypropylene glycol (Mn, 1,000) to polybutylene glycol (Mn, 700), Polybutylene Glycol Derivative E in which both end groups were substituted with —COONa was synthesized in the same way as in Synthesis Example 2.

[2] Production of Marine Biodegradation Accelerator

[Example 1-1] Production of Hydrophobic Alginic Acid Particles (A1 Particles)

The ingredients shown below were charged into a 2.000 mL flask and dispersed by one hour of stirring using an agitator.

| | |
|---|---|
| Spherical calcium alginate beads (Flavikafine ™, from Nisshinbo Chemical Inc.; MV = 20 μm) | 194.0 g |
| Deionized water | 735.0 g |
| Ethanol | 315.0 g |
| Sodium laurate | 6.0 g |

Next, the dispersion was gradually heated on an oil bath and, after heating for two hours at 95° C., hydrophobization was carried out by administering surface treatment while removing the solvent by distillation and concentrating the reaction solution. After cooling, centrifugal washing with deionized water was repeatedly carried out, ultimately arriving at a 10 wt % aqueous dispersion. This dispersion was spray-dried (hot-air temperature, 220° C.) using a spray dryer, giving the target A1 Particles. The A1 Particles were examined under a scanning electron microscope (S-4800, from Hitachi High-Technologies Corporation; referred to below as the "SEM") and the shapes were checked, whereupon the particle size was substantially the same as before hydrophobization. In addition, the particle size distribution was checked by particle size distribution measurement and found to be the same as before hydrophobization, thus confirming that the particles were monodispersed and free of agglomeration. FIG. 1 shows a SEM micrograph (2,000×) of the Hydrophobic Alginic Acid A1 Particles.

[Example 1-2] Production of Hydrophobic Alginic Acid Particles (A2 Particles)

The ingredients shown below were charged into a 5.000 mL heatable vessel and dispersed using an agitator.

| | |
|---|---|
| Sodium alginate (Kimika Algin ULV-L3 from Kimika Corporation; (40 mPa · s; 10 wt % aqueous solution)) | 313.6 g |
| Deionized water | 4,260.0 g |
| Sodium stearoyl glutamate | 6.4 g |

The dispersion was then heated to 60° C. and dissolution was carried out over two hours, thereby preparing a 7.0 wt % aqueous solution. Next, the aqueous solution was spray-dried (hot-air temperature, 200° C.) using a spray dryer, thereby forming particles. The resulting particles were examined with the SEM and the shapes were checked, and the particles were found to be flattened particles having recesses. Particle size measurement was carried out, whereupon these were found to be monodispersed particles having a mean volumetric diameter (MV) of 7 μm.

Next, 300.0 g of the resulting particles was placed in 300.0 g of ethanol and stirred to give a 50.0 wt % ethanol dispersion, after which the dispersion was added dropwise under stirring to an already prepared 20.0 wt % aqueous solution of calcium, chloride and crosslinking treatment was carried out. Stirring was continued for another two hours after the completion of dropwise addition.

Figure 2:
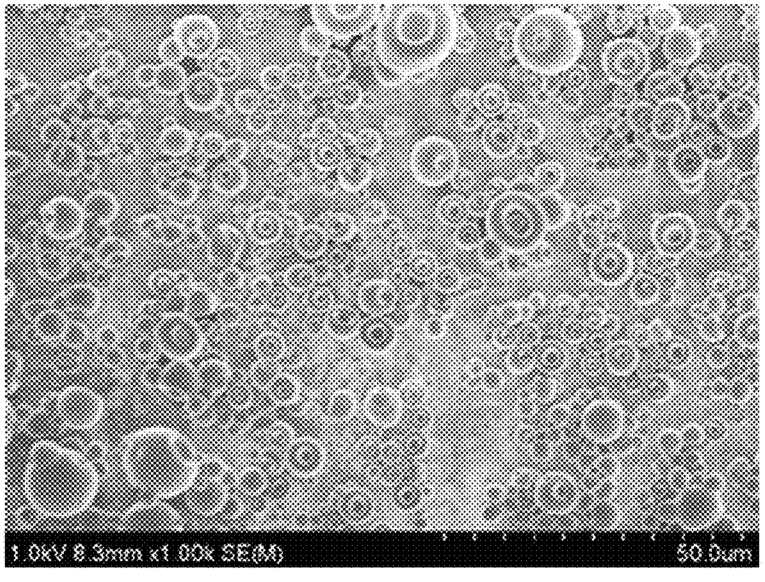
FIG. 2 shows a scanning electron micrograph (1,000×) of the Hydrophobic Alginic Acid Particles A2 obtained in Example 1-2.

Following the completion of stirring, centrifugal washing with deionized water was repeatedly carried out, ultimately giving a 10 wt % aqueous dispersion. This dispersion was spray-dried using a spray dryer, giving the target A2 Particles. The A2 Particles were examined with the SEM and the shapes were checked, whereupon the particle size was substantially the same as before hydrophobization. In addition, the particle size distribution was checked by particle size distribution measurement and found to be the same as before hydrophobization, thus confirming that the particles were monodispersed and free of agglomeration. FIG. 2 shows a SEM micrograph (1,000×) of the A2 Particles.

[Example 1-3] Production of Calcium Stearoyl Glutamate Particles (A3 Particles)

The ingredients shown below were charged into a 5.000 mL heatable vessel and dispersed and dissolved at 60° C. using an agitator.

| | |
|---|---|
| Sodium stearoyl glutamate | 100 g |
| Deionized water | 1,900 g |

Next, 1,350 g of a 20.0 wt % aqueous solution of calcium chloride was added dropwise under stirring, a calcium substitution reaction was carried out and the particles were allowed to settle out. Following the completion of stirring, filtration and washing were repeatedly carried out using deionized water and the particles were dried, giving the target A3 particles. The A3 particles were examined under a scanning electron microscope to ascertain their shape, whereupon they were found to be non-spherical particles. The A3 particles had a MV of 15 μm.

[Example 1-4] Production of Magnesium Dodecylbenzene Sulfonate Particles (A4 Particles)

The ingredients shown below were charged into a 5.000 mL heatable vessel and dispersed and dissolved at room temperature using an agitator.

| | |
|---|---|
| Sodium dodecylbenzene sulfonate | 200 g |
| Deionized water | 1,800 g |

Next, 2,000 g of a 20.0 wt % aqueous solution of magnesium chloride was added dropwise under stirring, a magnesium substitution reaction was carried out and the particles were allowed to settle out. Following the completion of stirring, filtration and washing were repeatedly carried out using deionized water and the particles were dried, giving the target A4 particles. The A4 particles were examined under a scanning electron microscope to ascertain their shape, whereupon they were found to be flaky particles. The A4 particles had a MV of 12 μm.

[Example 1-5] Production of Calcium N-Lauroyl Sarcosinate Particles (A5 Particles)

The ingredients shown below were charged into a 5.000 mL heatable vessel and dispersed and dissolved at room temperature using an agitator.

| | |
|---|---|
| Sodium N-lauroyl sarcosinate | 200 g |
| Deionized water | 2,300 g |

Next, 2,000 g of a 10.0 wt % aqueous solution of calcium chloride was added dropwise under stirring, a calcium substitution reaction was carried out and the particles were allowed to settle out. Following the completion of stirring, filtration and washing were repeatedly carried out using deionized water and the particles were dried, giving the target A5 particles. The A5 particles were examined under a scanning electron microscope to ascertain their shape, whereupon they were found to be flaky particles. The A5 particles had a MV of 28 μm.

[Example 1-6] Production of Calcium Salt of Ethylene Glycol Monododecyl Ether Derivative Particles (A6 Particles)

The ingredients shown below were charged into a 2.000 mL heatable vessel and dispersed and dissolved at 60° C. using an agitator.

| | |
|---|---|
| Ethylene Glycol Monododecyl Ether Derivative A | 120 g |
| Deionized water | 1,080 g |

Next, 600 g of a 20.0 wt % aqueous solution of calcium chloride was added dropwise under stirring, a calcium substitution reaction was carried out and the particles were allowed to settle out. Following the completion of stirring, filtration and washing were repeatedly carried out using a deionized water/ethanol mixed solution and the particles were dried, giving the target A6 particles. The A6 particles were examined under a scanning electron microscope to ascertain their shape, whereupon they were found to be non-spherical particles. The A6 particles had a MIV of 35 μm.

[Example 1-7] Production of Disodium Sebacate Particles (A7 Particles)

The ingredients shown below were charged into a 5.000 mL heatable vessel and dispersed and dissolved at 60° C. using an agitator.

| | |
|---|---|
| Disodium sebacate | 250 g |
| Deionized water | 2,250 g |

Next, 1,250 g of a 20.0 wt % aqueous solution of calcium chloride was added dropwise under stirring, a calcium substitution reaction was carried out and the particles were allowed to settle out. Following the completion of stirring, filtration and washing were repeatedly carried out using a deionized water/ethanol mixed solution and the particles were dried, giving the target A7 particles. The A7 particles were examined under a scanning electron microscope to ascertain their shape, whereupon they were found to be flaky particles. The A7 particles had a MV of 14 μm.

[Example 1-8] Production of Calcium Salt of Conjugated Derivative Particles (A8 Particles)

The ingredients shown below were charged into a 2,000 mL heatable vessel and dispersed and dissolved at 60° C. using an agitator.

| | |
|---|---|
| Ethylene Glycol Monododecyl Ether Derivative A | 80 g |
| Polypropylene Glycol Derivative B | 80 g |
| Ethanol | 120 g |
| Deionized water | 240 g |

Next, 1,200 g of a 20.0 wt % aqueous solution of calcium chloride was added dropwise under stirring, a calcium substitution reaction was carried out and the particles were allowed to settle out. Following the completion of stirring, filtration and washing were repeatedly carried out using deionized water and the particles were dried. The resulting particles were crushed using a crusher (Wonder Blender WB-1, from Osaka Chemical Co., Ltd.), giving the target A8 particles. The A8 particles had a MV of 281 μm.

[Example 1-9] Production of Calcium Salt of Conjugated Derivative Particles (A9 Particles)

The ingredients shown below were charged into a 3.000 mL heatable vessel and dispersed and dissolved at 60° C. using an agitator.

| | |
|---|---|
| Polybutylene Glycol Derivative E | 60 g |
| Sodium N-lauroyl sarcosinate | 240 g |
| Ethanol | 240 g |
| Deionized water | 360 g |

Next, 1,500 g of a 20.0 wt % aqueous solution of calcium chloride was added dropwise under stirring, a calcium substitution reaction was carried out and the particles were allowed to settle out. Following the completion of stirring, filtration and washing were repeatedly carried out using deionized water and the particles were dried. The resulting particles were crushed using a crusher (Wonder Blender WB-1, from Osaka Chemical Co., Ltd.), giving the target A9 particles. The A9 particles had a MV of 165 μm.

[Example 1-10] Production of Calcium Salt of Conjugated Derivative Particles (A10 Particles)

The ingredients shown below were charged into a 5,000 mL heatable vessel and dispersed and dissolved at 60° C. using an agitator.

| | |
|---|---|
| Sodium N-myristoyl sarcosinate | 270 g |
| Polypropylene Glycol Derivative B | 30 g |
| Ethanol | 120 g |
| Deionized water | 1,380 g |

Next, 1,500 g of a 20.0 wt % aqueous solution of calcium chloride was added dropwise under stirring, a calcium substitution reaction was carried out and the particles were allowed to settle out.

Following the completion of stirring, filtration and washing were repeatedly carried out using deionized water and the particles were dried. The resulting particles were size-reduced using a mill (the planetary ball mill P-7, from Fritsch GmbH), giving the target A10 particles. The A10 particles had a MV of 58 μm.

[Example 1-11] Production of Calcium Salt of Conjugated Derivative Particles (A11 Particles)

The ingredients shown below were charged into a 5.000 mL heatable vessel and dispersed and dissolved at 50° C. using an agitator.

| | |
|---|---|
| Disodium sebacate | 160 g |
| Polypropylene Glycol Derivative D | 40 g |
| Deionized water | 1,800 g |

Next, 1,750 g of a 20.0 wt % aqueous solution of calcium chloride was added dropwise under stirring, a calcium substitution reaction was carried out and the particles were allowed to settle out. Following the completion of stirring, filtration and washing were repeatedly carried out using deionized water and the particles were dried. The resulting particles were size-reduced using a mill (the planetary ball mill P-7, from Fritsch GmbH), giving the target A11 particles. The A11 particles had a MV of 25 μm.

[Example 1-12] Production of Hydrophobic CMC Particles (A12 Particles)

The ingredients shown below were charged into a 5,000 mL heatable vessel and completely dissolved using an agitator.

| | |
|---|---|
| Sodium carboxymethylcellulose | 120 g |
| Polypropylene Glycol Derivative C | 90 g |
| Sodium laurate | 90 g |
| Deionized water | 2,400 g |

To this was added a solution of 12.0 g of sorbitan trioleate dissolved in 1,550.0 g of hexane, and the system was stirred for 5 minutes using a homogenizer (T25, from IKA) in a temperature-maintained state, thereby effecting emulsification.

Next, the temperature was slowly raised to 65° C., following which a 20.0 wt % aqueous solution of calcium chloride was added dropwise. Following the completion of addition, stirring was carried out for another two hours while maintaining the temperature. After the completion of stirring, the system was cooled to room temperature, and centrifugal washing was repeatedly carried out using ethanol and deionized water, ultimately giving a 10 wt % aqueous dispersion. This dispersion was spray dried using a spray dryer (hot air temperature, 200° C.), giving the target A12 particles. The A12 particles were examined under a scanning electron microscope to ascertain their shape, whereupon they were found to be approximately spherical particles. The A12 particles had a MV of 8 μm.

[Example 1-13] Production of Hydrophobic Starch Octenyl Succinate Particles (A13 Particles)

The ingredients shown below were charged into a 5,000 mL heatable vessel and dispersed and dissolved at 50° C. using an agitator.

| | |
|---|---|
| Starch sodium octenyl succinate | 70 g |
| Sodium alginate | 10 g |
| Polybutylene Glycol Derivative E | 20 g |
| Deionized water | 1,150 g |

Next, 400 g of a 25.0 wt % aqueous solution of calcium chloride was added dropwise under stirring, a calcium substitution reaction was carried out and the particles were allowed to settle out. Following the completion of stirring, filtration and washing were repeatedly carried out using deionized water and the particles were dried. The resulting particles were crushed using a crusher (Wonder Blender WB-1, from Osaka Chemical Co., Ltd.), giving the target A13 particles. The A13 particles had a MV of 241 μm.

Comparative Example 1-1

The spherical beads of calcium alginate used in Example 1-1 (Flavikafine™, from Nisshinbo Chemical Inc.; MV=20 μm) were treated as the B1 Particles.

[Comparative Example 1-2] Production of Polymethyl Methacrylate Particles (B2 Particles)

The ingredients shown below were charged all at once into a 2,000 mL flask and spherical polymer B2 Particles of polymethyl methacrylate alone having a MV of 5 m were produced by the same method as in Comparative Example 1-3 in WO 2016/181877 A1.

| | |
|---|---|
| Water | 1,386.5 g |
| Methyl methacrylate | 173.4 g |

-continued

| | |
|---|---|
| Lauryl peroxide | 8.6 g |
| Polyvinyl pyrrolidone (K-30) | 17.3 g |

[Comparative Example 1-3] Production of Polystyrene Particles (B3 Particles)

The ingredients shown below were charged all at once into a 2,000 mL flask and a suspension was prepared using a dispersing element at 1,000 µm. The resulting dispersion was stirred at 80° C. for 8 hours under a stream of nitrogen using an oil bath, thereby giving a polystyrene particle dispersion.

| | |
|---|---|
| Water | 1,280.0 g |
| Styrene | 288.0 g |
| Lauryl peroxide | 14.2 g |
| Polyvinylpyrrolidone (K-30) | 21.6 g |

The resulting particle dispersion was passed through a sieve with 200 µm openings and transferred to a 3,000 mL flask. The particle dispersion that passed through the sieve was then subjected to centrifugal separation and this was repeated five times, thereby carrying out classification and washing operations, yielding spherical polymer B3 Particles of polystyrene alone having a MV of 10 µm.

[Comparative Example 1-4] Production of Crosslinked Polymethyl Methacrylate Particles (B4 Particles)

The ingredients shown below were charged all at once into a 2,000 mL flask, and spherical polymer B4 Particles of crosslinked polymethyl methacrylate alone having a MV of 5 µm were produced in the same way as in Comparative Example 1-2.

| | |
|---|---|
| Water | 1,386.5 g |
| Methyl methacrylate | 168.4 g |
| Ethylene glycol dimethacrylate | 5.0 g |
| Lauryl peroxide | 8.6 g |
| Polyvinyl pyrrolidone (K-30) | 17.3 g |

[Comparative Example 1-5] Production of Crosslinked Polystyrene Particles (B5 Particles)

The ingredients shown below were charged all at once into a 2,000 mL flask, and spherical polymer B5 Particles of crosslinked polystyrene alone having a MV of 10 µm were produced in the same way as in Comparative Example 1-3.

| | |
|---|---|
| Water | 1,280.0 g |
| Styrene | 280.0 g |
| Divinyl benzene | 8.0 g |
| Lauryl peroxide | 14.2 g |
| Polyvinyl pyrrolidone (K-30) | 21.6 g |

[Comparative Example 1-6] Production of Calcium Laurate Particles (A3 Particles)

The ingredients shown below were charged all at once into a 5,000 mL heatable flask, and dispersed and dissolved at room temperature using an agitator.

| | |
|---|---|
| Sodium laurate | 200 g |
| Deionized water | 1,800 g |

Next, 1,200 g of a 20.0 wt % aqueous solution of calcium chloride was added dropwise under stirring, a calcium substitution reaction was carried out and the particles were allowed to settle out. Following the completion of stirring, filtration and washing were repeatedly carried out using deionized water and the particles were dried, giving the target A3 particles. The A3 particles were examined under a scanning electron microscope to ascertain their shape, whereupon they were found to be flaky particles. The A3 particles had a MV of 21 µm.

[3] Measurement of Basic Properties

Examples 2-1 to 2-13, Comparative Examples 2-1 to 2-6

The water absorption, oil absorption and contact angle for each of the marine biodegradation accelerators were measured by the following methods. The results are shown in Table 1.

[Measurement of Oil Absorption]

The oil absorption (Ao) was measured in accordance with the boiled linseed oil method described in JIS K 5101.

[Measurement of Water Absorption]

Each marine biodegradation accelerator, in an amount of 1 gram, was placed in a 500 mL beaker, following which 200 mL of deionized water was added and 30 minutes of suspension stirring (150 rpm, 25° C.) was carried out. The beaker contents were then transferred to a 500 mL centrifuge tube and 30 minutes of centrifugation at 2,000 G was carried out using a centrifuge (himac CR20GII, from Koki Holdings Co., Ltd.). Following centrifugation, the supernatant was calmly discarded, the specimen was removed from the centrifuge tube and the weight ($W_w$) was measured. The specimen was then dried to a constant weight in a 105° C. drying oven and the dry weight ($D_w$) was measured. The water absorption (Aw) was calculated from the following formula.

$$Aw=[(Ww-Dw)/Dw]\times 100$$

[Measurement of Contact Angle]

In each example, two-sided tape was attached to an acrylic sheet, and the particles from that example were weighed out onto the two-sided tape in an amount of 1 mg/cm$^2$ and applied uniformly with a powder puff. A water drop was deposited thereon and the contact angle after 30 seconds was measured using a contact angle meter (Drop Master 300, from Kyowa Interface Science Co., Ltd.). The results are shown in Table 1.

TABLE 1

| | Particles (ingredients) | Aw (mL/100 g) | Ao (mL/100 g) | Aw/Ao | Contact angle |
|---|---|---|---|---|---|
| Example 2-1 | A1 particles (hydrophobic alginic acid particles) | 24 | 105 | 0.23 | 105 |
| Example 2-2 | A2 particles (hydrophobic alginic acid particles) | 18 | 94 | 0.19 | 126 |
| Example 2-3 | A3 particles (Ca stearoyl glutamate particles) | 22 | 68 | 0.32 | 121 |
| Example 2-4 | A4 particles (Mg dodecylbenzene sulfonate particles) | 20 | 76 | 0.26 | 107 |
| Example 2-5 | A5 particles (Ca lauroyl sarcosinate particles) | 26 | 80 | 0.33 | 101 |
| Example 2-6 | A6 particles (ethylene glycol monododecyl ether derivative Ca particles) | 28 | 84 | 0.33 | 97 |
| Example 2-7 | A7 particles (calcium sebacate particles) | 32 | 104 | 0.31 | 88 |
| Example 2-8 | A8 particles (ethylene glycol monododecyl ether derivative/ polypropylene glycol derivative Ca particles) | 24 | 88 | 0.27 | 92 |
| Example 2-9 | A9 particles (polybutylene glycol derivative/ Ca lauroyl sarcosinate particles) | 18 | 90 | 0.20 | 93 |
| Example 2-10 | A10 particles (myristoyl sarcosinic acid/ polypropylene glycol derivative Ca particles) | 18 | 110 | 0.16 | 116 |
| Example 2-11 | A11 particles (sebacic acid/polypropylene glycol derivative Ca particles) | 30 | 102 | 0.29 | 98 |
| Example 2-12 | A12 particles (hydrophobic CMC particles) | 36 | 82 | 0.44 | 82 |
| Example 2-13 | A13 particles (hydrophobic starch octenyl succinate particles) | 32 | 94 | 0.34 | 84 |
| Comparative Example 2-1 | B1 particles (Ca alginate particles) | 128 | 65 | 1.97 | 0 |
| Comparative Example 2-2 | B2 particles (PMMA particles) | 48 | 54 | 0.89 | 83 |
| Comparative Example 2-3 | B3 particles (PS particles) | 43 | 59 | 0.73 | 103 |
| Comparative Example 2-4 | B4 particles (crosslinked PMMA particles) | 41 | 55 | 0.75 | 93 |
| Comparative Example 2-5 | B5 particles (crosslinked PS particles) | 33 | 44 | 0.75 | 105 |
| Comparative Example 2-6 | B6 particles (C12 metal soap) | 16 | 98 | 0.16 | 125 |

[4] Solubility Tests

Examples 3-1 to 3-13, Comparative Examples 3-1 to 3-6

The particles in each example were dispersed in water or an aqueous sodium chloride solution (sodium chloride concentration, 3 wt %) to a concentration of 0.1 wt %, and solubility tests were carried out. The results are shown in Table 2.

(1) Appearance: The condition when 168 hours had elapsed following dispersion was visually checked.

(2) Shape: Changes in shape when 168 hours had elapsed following dispersion in an aqueous solution of sodium chloride, as compared with the shape prior to the test, were checked by measuring the particle size distribution.

(3) Transmittance: Letting SD1 be the percent transmittance of 560 nm wavelength light by a dispersion 168 hours after it was prepared by dispersing the particles in an aqueous solution of sodium, chloride, and letting WD1 be the percent transmittance of 560 nm wavelength light by a dispersion 24 hours it was prepared by dispersing the particles in water, the ratio WD1/SD1 for each example was calculated. The transmittances were measured using a UV-visible spectrophotometer (UV-2450, from JASCO Corporation).

TABLE 2

| | Particles | Appearance: Water | Appearance: Aqueous sodium chloride solution | Shape | SD1 | WD1 | WD1/ SD1 |
|---|---|---|---|---|---|---|---|
| Example 3-1 | A1 particles | cloudy | clear | changed | 92 | 17 | 0.18 |
| Example 3-2 | A2 particles | cloudy | clear | changed | 83 | 22 | 0.27 |
| Example 3-3 | A3 particles | cloudy | clear | changed | 82 | 29 | 0.35 |
| Example 3-4 | A4 particles | cloudy | translucent | changed | 76 | 32 | 0.46 |

TABLE 2-continued

| | Particles | Appearance: Water | Appearance: Aqueous sodium chloride solution | Shape | SD1 | WD1 | WD1/SD1 |
|---|---|---|---|---|---|---|---|
| Example 3-5 | A5 particles | cloudy | translucent | changed | 74 | 26 | 0.35 |
| Example 3-6 | A6 particles | cloudy | clear | changed | 81 | 21 | 0.26 |
| Example 3-7 | A7 particles | cloudy | translucent | changed | 70 | 15 | 0.21 |
| Example 3-8 | A8 particles | cloudy | clear | changed | 80 | 36 | 0.45 |
| Example 3-9 | A9 particles | cloudy | clear | changed | 81 | 26 | 0.32 |
| Example 3-10 | A10 particles | cloudy | translucent | changed | 71 | 33 | 0.46 |
| Example 3-11 | A11 particles | cloudy | translucent | changed | 80 | 22 | 0.28 |
| Example 3-12 | A12 particles | cloudy | clear | changed | 80 | 20 | 0.25 |
| Example 3-13 | A13 particles | cloudy | clear | changed | 82 | 34 | 0.42 |
| Comparative Example 3-1 | B1 particles | cloudy | clear | changed | 91 | 12 | 0.13 |
| Comparative Example 3-2 | B2 particles | cloudy | cloudy | unchanged | 48 | 47 | 0.98 |
| Comparative Example 3-3 | B3 particles | cloudy | cloudy | unchanged | 52 | 51 | 0.98 |
| Comparative Example 3-4 | B4 particles | cloudy | cloudy | unchanged | 44 | 44 | 1.00 |
| Comparative Example 3-5 | B5 particles | cloudy | cloudy | unchanged | 28 | 27 | 0.96 |
| Comparative Example 3-6 | B6 particles | separated (suspended) | separated (suspended) | unchanged | not measurable | — | — |

[5] Solubility Test 1 in Resin Formed Articles

Examples 4-1 to 4-8, Comparative Examples 4-1 to 4-5

Various particles (Particles A1 to A4, A7, A11 to A13, B1 and B4 to B6) were kneaded at 140° C. together with a biodegradable resin (polybutylene succinate adipate (PBSA); available as FD-92 from Mitsubishi Chemical Corporation) to a concentration of 20 wt % and pressure-molded at 150° C., producing 150 μm films (Examples 4-1 to 4-8, Comparative Examples 4-1 to 4-4). The respective particles retained their shapes within the film. In addition, PBSA alone (containing no particles) was pressure-molded at 150° C., producing a 150 μm thick film (Comparative Example 4-5).

The resulting film was cut into 10 mm squares, which were then placed in 50 mL of deionized water or 50 mL of a 3 wt % aqueous sodium chloride solution and left at rest for 30 days or 90 days at 25° C., following which the film was removed and the surface of the film was examined under a scanning electron microscope.

Figure 3:
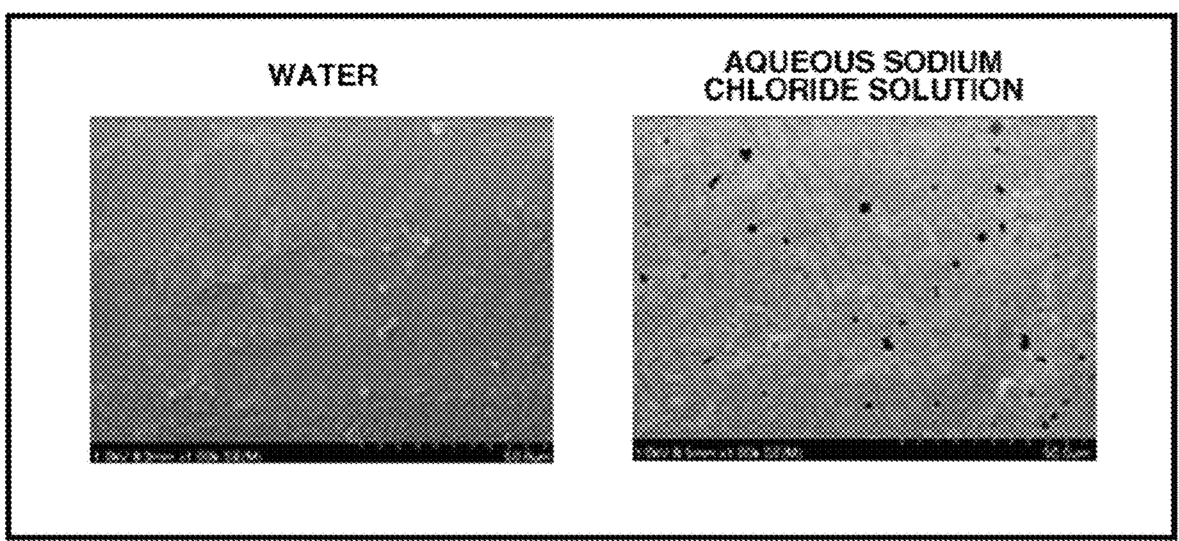
FIG. 3 shows one scanning electron micrograph (1,000×) taken after immersing the film of Example 4-2 for 30 days in water and another taken after immersing this film for 30 days in a 3 wt % aqueous solution of sodium chloride.

The results are shown in Table 3. Also, FIG. 3 shows SEM images of the film in Example 4-2 after 30 days of immersion in water and after 30 days of immersion in a 3 wt %/o aqueous sodium chloride solution.

TABLE 3

| | Particles | Water: 30 days | Water: 90 days | Aqueous sodium chloride solution: 30 days | Aqueous sodium chloride solution: 90 days |
|---|---|---|---|---|---|
| Example 4-1 | A1 particles | unchanged | unchanged | hole formation | surface becomes uneven |
| Example 4-2 | A2 particles | unchanged | unchanged | hole formation | surface becomes uneven |
| Example 4-3 | A3 particles | unchanged | unchanged | hole formation | surface becomes uneven |
| Example 4-4 | A4 particles | unchanged | unchanged | hole formation | surface becomes uneven |
| Example 4-5 | A7 particles | unchanged | unchanged | hole formation | surface becomes uneven |
| Example 4-6 | A11 particles | unchanged | unchanged | hole formation | surface becomes uneven |
| Example 4-7 | A12 particles | unchanged | unchanged | hole formation | surface becomes uneven |
| Example 4-8 | A13 particles | unchanged | unchanged | hole formation | surface becomes uneven |
| Comparative Example 4-1 | B1 particles | surface changes | cracks | hole fonnation | surface becomes uneven |
| Comparative Example 4-2 | B4 particles | unchanged | unchanged | unchanged | unchanged |
| Comparative Example 4-3 | B5 particles | unchanged | unchanged | unchanged | unchanged |

TABLE 3-continued

| | Particles | Water 30 days | Water 90 days | Aqueous sodium chloride solution 30 days | Aqueous sodium chloride solution 90 days |
|---|---|---|---|---|---|
| Comparative Example 4-4 | B6 particles | unchanged | unchanged | unchanged | unchanged |
| Comparative Example 4-5 | none | unchanged | unchanged | unchanged | unchanged |

[6] Solubility Test 2 in Resin Formed Articles

Examples 5-1 to 5-5, Comparative Examples 5-1 to 5-3

Various particles (Particles A5, A6, A8, A9, A10, B2 and B3) were kneaded at 140° C. together with a biodegradable resin (PBS; available as FZ-91 from Mitsubishi Chemical Corporation) to a concentration of 30 wt % and pressure-molded at a heating temperature of 150° C., producing 150 μm films (Examples 5-1 to 5-5, Comparative Examples 5-1 and 5-2). The various particles melted and mixed with the PBS, and so did not retain their shape. For the sake of comparison, a simple resin containing no particles was also produced (Comparative Example 5-3).

The resulting film was cut into 10 mm squares, which were then placed in 50 mL of deionized water or 50 mL of a 3 wt % aqueous sodium chloride solution and left at rest for 7 days or 60 days at 25° C., following which the film was removed and the surface of the film was examined under a scanning electron microscope.

Figure 4:
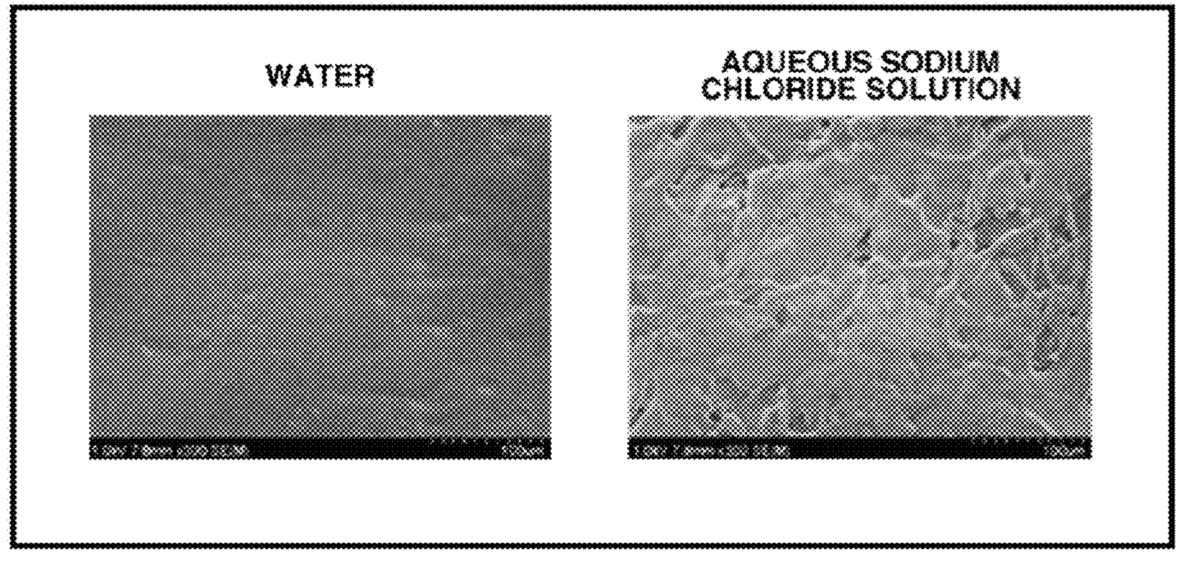
FIG. 4 shows one scanning electron micrograph (300×) taken after immersing the film of Example 5-4 for 7 days in water and another taken after immersing this film for 7 days in a 3 wt % aqueous solution of sodium chloride.

The results are shown in Table 4. Also, FIG. 4 shows SEM images of the film in Example 5-4 after 7 days of immersion in water and after 7 days of immersion in a 3 wt % aqueous sodium chloride solution.

TABLE 4

| | Particles | Water 7 days | Water 60 days | Aqueous sodium chloride solution 7 days | Aqueous sodium chloride solution 60 days |
|---|---|---|---|---|---|
| Example 5-1 | A5 particles | unchanged | unchanged | surface changes | surface becomes uneven, porosification |
| Example 5-2 | A6 particles | unchanged | unchanged | surface changes | surface becomes uneven, porosification |
| Example 5-3 | A8 particles | unchanged | unchanged | surface changes | surface becomes uneven, porosification |
| Example 5-4 | A9 particles | unchanged | unchanged | surface changes | surface becomes uneven, porosification |
| Example 5-5 | A10 particles | unchanged | unchanged | surface changes | surface becomes uneven, porosification |
| Comparative Example 5-1 | B2 particles | unchanged | unchanged | unchanged | unchanged |
| Comparative Example 5-2 | B3 particles | unchanged | unchanged | unchanged | unchanged |
| Comparative Example 5-3 | none | unchanged | unchanged | unchanged | unchanged |

[7] Biodegradability Test

Example 6, Comparative Example 6

A seawater biodegradation test was carried out by the following method on the Hydrophobic Alginic Acid A2 Particles (Example 6) and on microcrystalline cellulose (Avicel PH-101, from Sigma-Aldrich Co.) (Comparative Example 6).

<Test Method and Conditions>

Biodegradability Measurement Method:

The oxygen demand is measured with a closed respirometer (see ASTM D6691)

| | |
|---|---|
| Incubation temperature: | 30 ± 1° C:, dark place |
| Biodegradability (%) = | $BOD_0 - (BOD_B/ThOD) \times 100$ |
| $BOD_0$: | Biochemical oxygen demand in test or seed source activity verification (measured values: mg) |
| $BOD_B$: | Average biochemical oxygen demand in blank test (measured values: mg) |
| ThOD: | Theoretical oxygen demand required in cases where test material or control material has completely oxidized (measured values: mg) |

Figure 5:
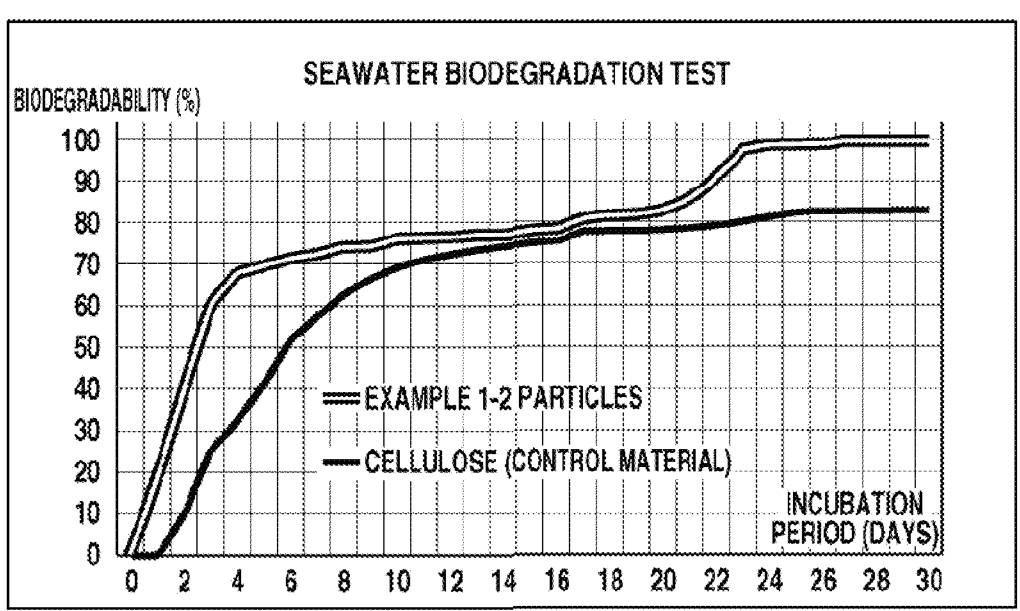
FIG. 5 is a graph showing the results of biodegradation tests in Example 6 and Comparative Example 6.

The results are shown in FIG. 5.

From the results shown in FIG. 5, good biodegradability results with a degree of biodegradation in excess of 90% were obtained within an incubation time of 30 days even for particles that were subjected to hydrophobizing treatment.

[8] Verification Tests in Seawater

Examples 7-1 to 7-6, Comparative Examples 7-1 to 7-3

In each example, seawater (Tokyo Bay [Chiba Port in Chiba Prefecture] was placed in a 15 L water tank, and 15-mm squares of films having the same compositions as those produced in Sections [5] and [6] above and used in the below-indicated Examples and Comparative Examples were inserted into a stainless steel net, immersed in the seawater and were observed over time. After 720 hours had elapsed, the condition of the surface layer was checked under a scanning electron microscope. The results are shown in Table 5.

<Films Used>

Examples 4-2, 4-5, 4-7, 5-1, 5-3

Comparative Examples 4-2, 5-2, 5-3

TABLE 5

| | Particles | Particle filling shape | Seawater 30 days | Seawater State |
|---|---|---|---|---|
| Example 7-1 | A2 particles | particles | changed | porosification, surface becomes uneven |
| Example 7-2 | A7 particles | particles | changed | porosification, surface becomes uneven |
| Example 7-3 | A12 particles | particles | changed | porosification, surface becomes uneven |
| Example 7-4 | A5 particles | molten | changed | porosification, surface becomes uneven |
| Example 7-5 | A9 particles | molten | changed | porosification, surface becomes uneven |
| Comparative Example 7-1 | B4 particles | particles | substantially unchanged | substantially unchanged |
| Comparative Example 7-2 | B3 particles | molten | substantially unchanged | substantially unchanged |
| Comparative Example 7-3 | none | — | substantially unchanged | substantially unchanged |

From the results shown in Table 5, it appears that biodegradation is accelerated owing to the presence of microorganisms in seawater.

[9] Surface Modification Test in General-Purpose Resins

Examples 8-1 to 8-4, Comparative Examples 8-1 to 8-3

Resin compositions were prepared by mixing the respective particles into an acrylic emulsion (Joncryl PDX7511, from BASF) to a concentration of 10 wt %, and the resin composition was coated onto one side of a 100 μm thick PET film (E-5000, from Toyobo Co., Ltd.) using a commercial bar coater. After coating, a dryer was set to 50° C. and hot-air drying was carried out for 20 minutes, producing a film having a thickness of 100 μm.

The resulting film was cut into 10 mm squares, each of which was placed in 50 mL of a 3 wt % aqueous sodium chloride solution and left at rest for 502 hours at 25° C. The film was then removed and the surface of the film was examined with a scanning electron microscope.

Figure 6:
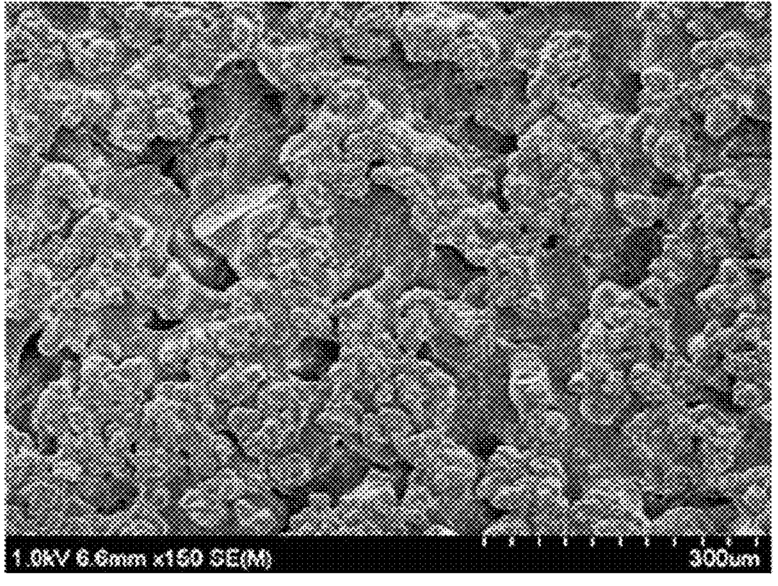
FIG. 6 shows a scanning electron micrograph (150×) of the surface of the film of Example 8-1 taken after immersing the film for 21 days in a 3 wt % aqueous solution of sodium chloride.

The results are shown in Table 6. FIG. 6 shows a scanning electron micrograph (150×) of the surface layer of the film in Example 8-1 after it was immersed for 21 days in a 3 wt % aqueous solution of sodium chloride.

TABLE 6

| | Particles | After immersion in aqueous sodium chloride solution (21 days) |
|---|---|---|
| Example 8-1 | A2 particles | surface unevenness, porosification |
| Example 8-2 | A7 particles | surface unevenness, porosification |
| Example 8-3 | A9 particles | surface unevenness, porosification |
| Comparative Example 8-1 | B4 particles | unchanged |
| Comparative Example 8-2 | B5 particles | unchanged |
| Comparative Example 8-3 | none | unchanged |

The results shown in Table 6 demonstrate that the marine biodegradation accelerators of the invention, by virtue of their solubility, can be used in general-purpose resins as surface and surface layer modifiers and as hole-forming agents for producing porous bodies. Also, the results shown in FIG. 6 confirmed that penetration to the interior, erosion, porosification and hole formation, and surface unevenness occurred.

From the above results, the marine biodegradation accelerators of the invention maintain hydrophobicity in fresh water, yet undergo biodegradation in seawater sooner than biodegradable resins, thus facilitating dissolution through decomposition into smaller molecules and salt substitution. Hence, resin compositions containing the marine biodegradation accelerators of the invention become porous in seawater, helping microorganisms to adhere and thus working to promote the acceleration of biodegradation, which ultimately makes it possible to reduce the burden on the environment.

The invention claimed is:

1. A marine biodegradation accelerator comprising a compound which contains one or more anion, including an anion having six or more carbon atoms and three or more oxygen atoms, and a metal cation having a valence of two or more, the anion and the metal cation being bonded together via an ionic bond, wherein the compound has a contact angle of 30° or more when 30 seconds have elapsed after a water droplet is placed on particles made of the compound, wherein the anion having six or more carbon atoms and three or more oxygen atoms comes from a water-soluble anionic polymer;

the accelerator is obtained by subjecting a crosslinked polymer comprised of the water-soluble anionic polymer and the metal cation having a valence of two or more to hydrophobization; and the water-soluble anionic polymer has at least one anionic functional group selected from the group consisting of carboxyl, hydroxyl, sulfonic acid, sulfate and phosphate ester groups and also anionic functional groups having a structure in which a hydrogen atom on any of said groups is substituted with a monovalent metal.

2. The marine biodegradation accelerator of claim 1, wherein the accelerator has a water absorption per 100 g and an oil absorption per 100 g such that the water absorption is lower than the oil absorption.

3. The marine biodegradation accelerator of claim 1 wherein, at 25° C., the accelerator is insoluble in water and soluble in a 3 wt % aqueous solution of sodium chloride.

4. The marine biodegradation accelerator of claim 1 wherein, letting SD1 be the percent transmittance of 560 nm wavelength light by the accelerator 168 hours after being dispersed to a concentration of 0.1 wt % in a 3 wt % aqueous solution of sodium chloride and WD1 be the percent transmittance of 560 nm wavelength light by the accelerator at room temperature 24 hours after being dispersed in water to a concentration of 0.1 wt %, the ratio WD1/SD1 is not more than 0.9.

5. The marine biodegradation accelerator of claim 1, wherein the accelerator is in the form of particles.

6. The marine biodegradation accelerator of claim 1, wherein the metal cation is of at least one type selected from the group consisting of calcium, magnesium, aluminum, zinc, iron, copper and barium ions.

7. The marine biodegradation accelerator of claim 1, wherein hydrophobization is carried out using at least one hydrophobizing agent selected from the group consisting of monovalent carboxylic acid salts, monovalent amino acid derivative salts, monovalent sulfate ester salts, monovalent sulfonic acid salts, monovalent phosphate ester salts and monovalent lactic acid ester salts.

8. A marine biodegradation accelerator, comprising a compound which contains one or more anion, including an anion having six or more carbon atoms and three or more oxygen atoms, and a metal cation having a valence of two or more, the anion and the metal cation being bonded together via an ionic bond, wherein the compound has a contact angle of 30° or more when seconds have elapsed after a water droplet is placed on particles made of the compound, the anion having six or more carbon atoms and three or more oxygen atoms is a monovalent anion having six or more carbon atoms and three or more oxygen atoms or an anion having two monovalent anionic substituents which has six or more carbon atoms and three or more oxygen atoms, wherein the monovalent anion having six or more carbon atoms and three or more oxygen atoms is a monovalent anion obtained by introducing one monovalent anionic substituent selected from a carboxylic acid anion, a sulfonic acid anion, a sulfuric acid anion, and a phosphoric acid anion into a monohydric alcohol having 6 to 30 carbon atoms, a monoamino compound having 6 to 30 carbon atoms, or a (poly)alkylene glycol ether having an HLB value of 16 or less, or is derived from an amino acid derivative salt having 6 to 30 carbon atoms or a sulfonic acid salt having 6 to 30 carbon atoms, and the anion having two monovalent anionic substituents which has six or more carbon atoms and three or more oxygen atoms is an anion obtained by introducing two monovalent anionic substituent selected from a carboxylic acid anion, a sulfonic acid anion, a sulfuric acid anion, and a phosphoric acid anion into a dihydric alcohol having 6 to 30 carbon atoms, a (poly)alkylene glycol selected from (poly)propylene glycol, (poly)butylene glycol, (poly)tetramethylene ether glycol, (poly)hexamethylene ether glycol and (poly)octamethylene ether glycol, or a copolymer thereof, or is derived from a dicarboxylic acid salt having 6 to 30 carbon atoms or a disulfonic acid salt having 6 to 30 carbon atoms.

9. A resin composition comprising the marine biodegradation accelerator of claim 1 and a resin.

10. The resin composition of claim 9, wherein the resin is a biodegradable resin.

11. A molded or formed body obtained from the resin composition of claim 9.

12. A surface modifier comprising the marine biodegradation accelerator of claim 1.

13. The marine biodegradation accelerator of claim 1 wherein the water-soluble anionic polymer is at least one type of polysaccharide monovalent salt selected from among monovalent salts of alginic acid, monovalent salts of carboxymethylcellulose, monovalent salts of modified starches, monovalent salts of hyaluronic acid, monovalent salts of chondroitin sulfuric acid, monovalent salts of glucosaminoglycan derivatives, monovalent salts of cellulose derivatives, monovalent salts of starch derivatives, monovalent salts of chitosan derivatives and monovalent salts of chitin derivatives.

14. The marine biodegradation accelerator of claim 1 wherein the water-soluble anionic polymer is at least one type of polysaccharide monovalent salt selected from among sodium alginate, potassium alginate, ammonium alginate, sodium carboxymethylcellulose, potassium carboxymethylcellulose, ammonium carboxymethylcellulose, starch sodium octenyl succinate, starch sodium glycolate, sodium hyaluronate and sodium chondroitin sulfate.

15. The marine biodegradation accelerator of claim 8 wherein the monovalent anion having six or more carbon atoms and three or more oxygen atoms is a monovalent anion obtained by introducing one monovalent anionic substituent selected from a carboxylic acid anion and a sulfonic acid anion into a (poly)alkylene glycol ether having an HLB value of 16 or less, or is derived from an amino acid derivative salt having 6 to 30 carbon atoms or a sulfonic acid salt having 6 to 30 carbon atoms, and the anion having two monovalent anionic substituents which has six or more carbon atoms and three or more oxygen atoms is an anion obtained by introducing two monovalent anionic substituent selected from a carboxylic acid anion and a sulfonic acid anion into (poly) propylene glycol or (poly)butylene glycol, or is derived from a dicarboxylic acid salt having 6 to 30 carbon atoms or a disulfonic acid salt having 6 to 30 carbon atoms.

* * * * *